US012666047B2

(12) United States Patent
Park et al.

(10) Patent No.: US 12,666,047 B2
(45) Date of Patent: Jun. 23, 2026

(54) IMAGE DECODING METHOD AND DEVICE THEREFOR

(71) Applicant: LG Electronics Inc., Seoul (KR)

(72) Inventors: Naeri Park, Seoul (KR); Jaehyun Lim, Seoul (KR); Junghak Nam, Seoul (KR); Jangwon Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/701,082

(22) PCT Filed: Dec. 9, 2022

(86) PCT No.: PCT/IB2022/061960
§ 371 (c)(1),
(2) Date: Apr. 12, 2024

(87) PCT Pub. No.: WO2023/062614
PCT Pub. Date: Apr. 20, 2023

(65) Prior Publication Data
US 2024/0357130 A1 Oct. 24, 2024

(30) Foreign Application Priority Data

Oct. 12, 2021 (KR) ........................ 10-2021-0134588

(51) Int. Cl.
*H04N 19/11* (2014.01)
*H04N 19/117* (2014.01)
(Continued)

(52) U.S. Cl.
CPC ......... *H04N 19/159* (2014.11); *H04N 19/117* (2014.11); *H04N 19/139* (2014.11);
(Continued)

(58) Field of Classification Search
CPC ............................. H04N 19/59; H04N 19/593
See application file for complete search history.

(56) References Cited

U.S. PATENT DOCUMENTS 11,095,917 B2 * 8/2021 Zhang ..................... H04N 19/52
12,022,087 B2 * 6/2024 Liu ....................... H04N 19/139
(Continued)

FOREIGN PATENT DOCUMENTS

KR 10-2020-0116462 10/2020
KR 10-2021-0038377 4/2021
KR 10-2021-0094530 7/2021

OTHER PUBLICATIONS

Affine Intra prediction for VVC; Jayasingam—2020; (Year: 2020).*
(Continued)

*Primary Examiner* — Luis Perez-Fuentes
(74) *Attorney, Agent, or Firm* — Fish & Richardson P.C.

(57) ABSTRACT

An image decoding method performed by a decoding device, according to the present disclosure, comprises the steps of: deriving an intra block copy (IBC) mode as a prediction mode of a current block; deriving one or more block vectors and/or scaling information for the IBC mode; deriving a revised reference block for the current block by using the one or more block vectors and/or the scaling information in a current picture; deriving a prediction sample of the current block on the basis of the revised reference block; and generating a reconstructed picture on the basis of the prediction sample.

15 Claims, 22 Drawing Sheets

(51) Int. Cl.

| | |
|---|---|
| *H04N 19/139* | (2014.01) |
| *H04N 19/159* | (2014.01) |
| *H04N 19/176* | (2014.01) |
| *H04N 19/59* | (2014.01) |
| *H04N 19/80* | (2014.01) |

(52) U.S. Cl.
CPC ........... *H04N 19/176* (2014.11); *H04N 19/59*
(2014.11); *H04N 19/80* (2014.11)

(56) References Cited

U.S. PATENT DOCUMENTS

| | | | | |
|---|---|---|---|---|
| 12,284,330 B2 * | 4/2025 | Park | ..................... | H04N 19/157 |
| 12,316,877 B2 * | 5/2025 | Chen | ..................... | H04N 19/176 |
| 12,464,160 B2 * | 11/2025 | Robert | ................ | H04N 19/567 |
| 2019/0335191 A1 * | 10/2019 | Kondo | ................... | H04N 19/85 |
| 2020/0213608 A1 | 7/2020 | Chen et al. | | |
| 2024/0275979 A1 * | 8/2024 | Wang | ................. | H04N 19/105 |

OTHER PUBLICATIONS

Block vector prediction in Intra block copy for HEVC screen
content coding; Xu; 2015; (Year: 2015).*
Adhuran et al., "Affine Intra-prediction for Versatile Video Coding,"
IEEE, Jan. 18, 2021, p. 545-549.

\* cited by examiner

FIG. 2

DETERMINE PREDICTION MODE FOR CURRENT BLOCK BASED ON RECEIVED PREDICTION INFORMATION — S1100

DERIVE MOTION VECTOR — S1110

PERFORM PREDICTION (GENERATE PREDICTION SAMPLES) — S1120

DERIVE RESIDUAL SAMPLES BASED ON RESIDUAL INFORMATION — S1130

RECONSTRUCT PICTURE BASED ON PREDICTION SAMPLES AND RESIDUAL SAMPLES — S1140

DERIVE IBC MODE AS PREDICTION MODE OF CURRENT BLOCK — S1700

DERIVE REVISED REFERENCE BLOCK FOR
CURRENT BLOCK IN CURRENT PICTURE — S1710

DERIVE PREDICTION SAMPLE OF CURRENT BLOCK
BASED ON REVISED REFERENCE BLOCK — S1720

ENCODE IMAGE INFORMATION INCLUDING PREDICTION MODE
INFORMATION OF CURRENT BLOCK — S1730

DERIVE IBC MODE AS PREDICTION MODE OF CURRENT BLOCK —— S1900

DERIVE REVISED REFERENCE BLOCK FOR
CURRENT BLOCK IN CURRENT PICTURE —— S1910

DERIVE PREDICTION SAMPLE OF CURRENT BLOCK BASED ON
REVISED REFERENCE BLOCK —— S1920

GENERATE RECONSTRUCTED PICTURE BASED ON
PREDICTION SAMPLE —— S1930

IMAGE DECODING METHOD AND DEVICE THEREFOR

CROSS-REFERENCE TO RELATED APPLICATIONS

This application is a National Stage application under 35 U.S.C. § 371 of International Application No. PCT/IB2022/061960, filed on Dec. 9, 2022, which claims the benefit of Korean Patent Application No. 10-2021-0134588, filed on Oct. 12, 2021. The disclosures of the prior applications are incorporated by reference in their entirety.

BACKGROUND OF DISCLOSURE

Field of the Disclosure

The present disclosure relates to an image coding technology, and more specifically, to an image decoding method and apparatus for deriving a prediction block by deriving a reference block of a current block to which an intra block copy (IBC) mode is applied in an image coding system.

Related Art

Recently, the demand for high resolution and high quality image/video such as an ultra-high definition (UHD) video/image having a resolution of 4K or 8K or more is increasing in various fields. As the resolution or quality becomes higher, relatively the amount of information or bits of video/image data are transmitted increases as compared to conventional video/image data. Therefore, when image data is transmitted using a medium such as an existing wired/wireless broadband line or video/image data is stored using an existing storage medium, costs for transmission and storage are increased.

Furthermore, the interest and demand for virtual reality (VR) and artificial reality (AR) content, or immersive media such as holograms, are recently increasing. Broadcasting of images/videos having image/video characteristics different from those of an actual image/video, such as game images/videos, is increasing.

Therefore, a highly efficient image compression technique is required to effectively compress, transmit, store, or play high resolution and high quality video/image information having various characteristics as described above.

SUMMARY THE DISCLOSURE

The technical aspect of the present disclosure is to provide a method and an apparatus for increasing image coding efficiency.

Another technical aspect of the present disclosure is to provide a method and apparatus for performing prediction according to an intra block copy (IBC) mode for a current block.

Another technical aspect of the present disclosure is to provide a method and apparatus for deriving a reference block of a current block to which an IBC mode is applied.

The techniques of the present disclosure relate to an IBC mode, and more specifically, to deriving a reference block of a current block to which an IBC mode is applied. Since duplicate images of neighboring blocks in a current picture may be variously deformed, when the neighboring blocks are derived as reference blocks without any change, there may be a problem that prediction accuracy is degraded. According to embodiments of the present disclosure, in consideration of a difference in deformation between a neighboring block and a current block, affine prediction and/or scaling technology may be applied to deform the neighboring block and generate a reference block. Through this, the accuracy of a prediction block in an IBC mode is increased, thereby improving coding efficiency.

According to one embodiment of the present disclosure, an image decoding method that is performed by a decoding apparatus is provided. The method includes deriving an IBC mode as a prediction mode of a current block, deriving one or more block vectors and/or scaling information for the IBC mode, deriving a revised reference block for the current block using the one or more block vectors and/or the scaling information in a current picture, deriving a prediction sample of the current block based on the revised reference block, and generating a reconstructed picture based on the prediction sample.

According to another embodiment of the present disclosure, a decoding apparatus that performs image decoding is provided. The decoding apparatus includes a memory and at least one processor connected to the memory, wherein the at least one processor derives an IBC mode as a prediction mode of a current block, derives one or more block vectors and/or scaling information for the IBC mode, derives a revised reference block for the current block using the one or more block vectors and/or the scaling information in a current picture, derives a prediction sample of the current block based on the revised reference block, and generates a reconstructed picture based on the prediction sample.

According to still another embodiment of the present disclosure, an image encoding method that is performed by an encoding apparatus is provided. The method includes deriving an IBC mode as a prediction mode of a current block, deriving one or more block vectors and/or scaling information for the IBC mode, deriving a revised reference block for the current block using the one or more block vectors and/or the scaling information in a current picture, deriving a prediction sample of the current block based on the revised reference block, and encoding image information including prediction mode information of the current block.

According to yet another embodiment of the present disclosure, an image encoding apparatus is provided. The encoding apparatus includes a memory and at least one processor connected to the memory, wherein the at least one processor derives an IBC mode as a prediction mode of a current block, derives one or more block vectors and/or scaling information for the IBC mode, derives a revised reference block for the current block using the one or more block vectors and/or the scaling information in a current picture, derives a prediction sample of the current block based on the revised reference block, and encodes image information including prediction mode information of the current block.

According to yet another embodiment of the present disclosure, a digital storage medium is provided. The digital storage medium may store a bitstream including image information which includes prediction mode information encoded through an image encoding method according to the present disclosure.

According to yet another embodiment of the present disclosure, a method of transmitting data about an image is provided. The method of transmitting the data includes obtaining a bitstream of image information including prediction mode information of a current block, and transmitting the data including the bitstream of the image information including the prediction mode information, wherein the prediction mode information is encoded by deriving an IBC mode as a prediction mode of the current block, deriving one or more block vectors and/or scaling information for the IBC mode, deriving a revised reference block for the current block using the one or more block vectors and/or the scaling information in a current picture, and deriving a prediction sample of the current block based on the revised reference block.

According to yet another embodiment of the present disclosure, an apparatus for transmitting data about an image is provided. The apparatus includes at least one professor configured to obtain a bitstream of image information including prediction mode information of a current block, and a transmitter configured to transmit the data including the bitstream of the image information including the prediction mode information, wherein the prediction mode information is encoded by deriving an IBC mode as a prediction mode of the current block, deriving one or more block vectors and/or scaling information for the IBC mode, deriving a revised reference block for the current block using the one or more block vectors and/or the scaling information in a current picture, and deriving a prediction sample of the current block based on the revised reference block.

According to the present disclosure, by applying affine prediction in relation to a current block to which an IBC mode is applied, in consideration of deformation, a more accurate reference block is derived, thereby improving prediction accuracy and improving overall coding efficiency.

According to the present disclosure, by applying affine prediction in consideration of only rotation deformation in relation to a current block to which an IBC mode is applied, a more accurate reference block is derived, thereby improving prediction accuracy and improving overall coding efficiency.

According to the present disclosure, by applying scaling in relation to a current block to which an IBC mode is applied, in consideration of deformation, a reference block is derived, thereby improving prediction accuracy and improving overall coding efficiency.

BRIEF DESCRIPTION OF THE DRAWINGS

FIG. 2 is a diagram schematically illustrating a configuration of a video/image encoding apparatus to which embodiments of the present disclosure are applicable.

DESCRIPTION OF EMBODIMENTS

Figure 1:
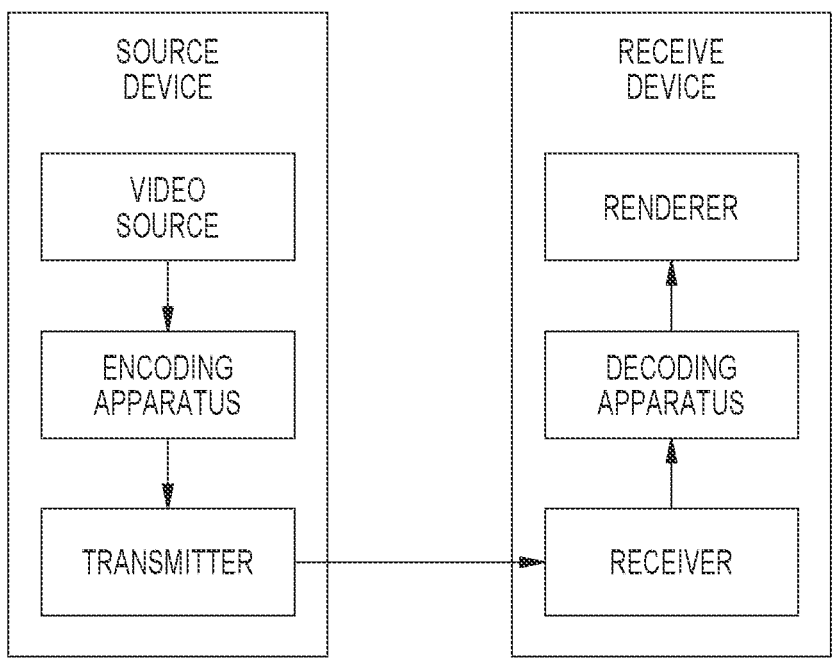
FIG. 1 schematically illustrates an example of a video/image coding system to which embodiments of the present disclosure are applicable.

The present disclosure may be modified in various forms, and specific embodiments thereof will be described and illustrated in the accompanying drawings. However, the embodiments are not intended for limiting the disclosure. Terms used in the following description are used to merely describe specific embodiments but are not intended to limit the disclosure. An expression of a singular number includes an expression of the plural number as long as it is clearly read differently. Terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be divided into plural elements. The embodiments in which the elements are combined and/or divided belong to the disclosure without departing from the concept of the disclosure.

Hereinafter, embodiments of the present disclosure will be described in detail with reference to the accompanying drawings. In addition, like reference numerals are used to indicate like elements throughout the drawings, and the same descriptions on the like elements will be omitted.

FIG. 1 schematically illustrates an example of a video/image coding system to which embodiments of the present disclosure are applicable.

Referring to FIG. 1, the video/image coding system may include a first device (source device) and a second device (receiving device). The source device may transmit encoded video/image information or data in the form of a file or streaming to the receiving device through a digital storage medium or a network.

The source device may include a video source, an encoding apparatus, and a transmitter. The receiving device may include a receiver, a decoding apparatus, and a renderer. The encoding apparatus may be referred to as a video/image encoding apparatus, and the decoding apparatus may be referred to as a video/image decoding apparatus. The transmitter may be included in the encoding apparatus. The receiver may be included in the decoding apparatus. The renderer may include a display, and the display may be configured as a separate device or an external component.

The video source may obtain a video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, a computer, a tablet PC, or a smartphone and may (electronically) generate video/images. For example, a virtual video/image may be generated through a computer or the like, and in this case, a video/image capture process may be replaced with a process of generating related data.

The encoding apparatus may encode an input video/image. The encoding apparatus may perform a series of procedures such as prediction, transform, and quantization for compression and coding efficiency. Encoded data (encoded video/image information) may be output in the form of a bitstream.

The transmitter may transmit the encoded video/image information or data output in the form of a bitstream to the receiver of the receiving device in the form of a file or streaming via a digital storage medium or a network. The digital storage medium may include various storage media such as a universal serial bus (USB) drive, a solid disc (SD), a compact disc (CD), a digital versatile disc (DVD), a Blue-ray disc, a hard disc drive (HDD), and a solid state drive (SSD). The transmitter may include an element for generating a media file through a predetermined file format and may include an element for transmission through a broadcast/communication network. The receiver may receive/extract the bitstream and may transmit the bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

The present disclosure relates to video/image coding. For example, methods/embodiments disclosed in the present disclosure may be applied to a method disclosed in the versatile video coding (VVC) standard, the essential video coding (EVC) standard, the AOMedia Video 1 (AV1) standard, the 2nd generation of audio video coding standard (AVS2), or the next generation video/image coding standard (for example, H.267 or H.268).

The present disclosure presents various embodiments related to video/image coding, and the embodiments may be performed in combination with each other unless otherwise mentioned.

In the present disclosure, a video may refer to a set of a series of images over time. A picture generally refers to a unit representing one image at a specific time, and a sub-picture/slice/tile is a unit that forms a part of a picture in coding. The subpicture/slice/tile may include one or more coding tree units (CTUs). One picture may consist of one or more subpictures/slices/tiles. One picture may consist of one or more tile groups. One tile group may include one or more tiles. A brick may represent a quadrangular area of CTU rows within a tile in a picture. A tile may be partitioned into multiple bricks, and each brick may consist of one or more CTU rows within the tile. A tile that is not partitioned into multiple bricks may be also referred to as a brick. A brick scan may refer to a specific sequential ordering of CTUs partitioning a picture, and the CTUs may be arranged in a CTU raster scan in a brick. Bricks within a tile may be arranged consecutively in a raster scan of the bricks of the tile, and tiles in a picture may be arranged consecutively in a raster scan of the tiles of the picture. In addition, a subpicture may represent a quadrangular area of one or more slices within a picture. That is, a subpicture may include one or more slices that collectively cover a quadrangular area of a picture. A tile is a quadrangular area of CTUs within a particular tile column and a particular tile row in a picture. The tile column may be a quadrangular area of CTUs, and the quadrangular area may have a height equal to a height of the picture and a width specified by syntax elements in a picture parameter set (PPS). The tile row may be a quadrangular area of CTUs, and the quadrangular area may have a width specified by syntax elements in a PPS and a height equal to a height of the picture. A tile scan is a specific sequential ordering of CTUs partitioning a picture, the CTUs may be arranged consecutively in a CTU raster scan in a tile, and tiles in a picture may be arranged consecutively in a raster scan of the tiles of the picture. A slice may include an integer number of bricks of a picture, and the integer number of bricks may be included in a single network abstraction layer (NAL) unit. A slice may consist of either a number of complete tiles or may also be a consecutive sequence of complete bricks of one tile. Tile groups and slices may be used interchangeably in the present disclosure. For example, in the present disclosure, a tile group/tile group header may be referred to as a slice/slice header.

A pixel or pel may refer to a smallest unit constituting one picture (or image). Also, "sample" may be used as a term corresponding to a pixel. A sample may generally represent a pixel or a value of a pixel and may represent only a pixel/pixel value of a luma component or only a pixel/pixel value of a chroma component.

A unit may represent a basic unit of image processing. The unit may include at least one of a specific area of a picture and information related to the area. One unit may include one luma block and two chroma (for example, cb and cr) blocks. In some cases, the unit may be used interchangeably with terms such as a block or an area. In a general case, an M×N block may include samples (or sample arrays) or a set (or array) of transform coefficients of M columns and N rows.

In the present disclosure, "A or B" may refer to "only A." "only B." or "both A and B." In other words, in the present specification, "A or B" may be interpreted as "A and/or B." For example, in the present disclosure. "A. B. or C" may refer to "only A." "only B." "only C," or "any combination of A, B, and C."

A slash (/) or a comma used in the present disclosure may refer to "and/or." For example, "A/B" may refer to "A and/or B." Accordingly, "A/B" may refer to "only A." "only B," or "both A and B." For example, "A, B, and C" may refer to "A, B, or C."

In the present disclosure, "at least one of A and B" may refer to "only A," "only B." or "both A and B." In addition, in the present disclosure, the expression "at least one of A or B" or "at least one of A and/or B" may be interpreted the same as "at least one of A and B."

In addition, in the present disclosure, "at least one of A, B, and C" may refer to "only A." "only B." "only C," or "any combination of A, B, and C." Also, "at least one of A, B, or C" or "at least one of A, B, and/or C" may refer to "at least one of A, B, and C."

In addition, parentheses used in the present disclosure may refer to "for example." Specifically, when "prediction (intra prediction)" is indicated, "intra prediction" may be proposed as an example of "prediction." In other words, "prediction" in the present disclosure is not limited to "intra prediction," and "intra prediction" may be proposed as an example of "prediction." Also, even when "prediction (that is, intra prediction)" is indicated, "intra prediction" may be proposed as an example of "prediction."

In the present disclosure, technical features that are individually described within one drawing may be implemented individually or may be implemented at the same time.

The following drawings were created to describe a specific example of the present disclosure. Since the names of specific devices shown in the drawings or the names of specific signals/messages/fields are presented by way of example, the technical features of the present disclosure are not limited to the specific names used in the following drawings.

Figure 2:
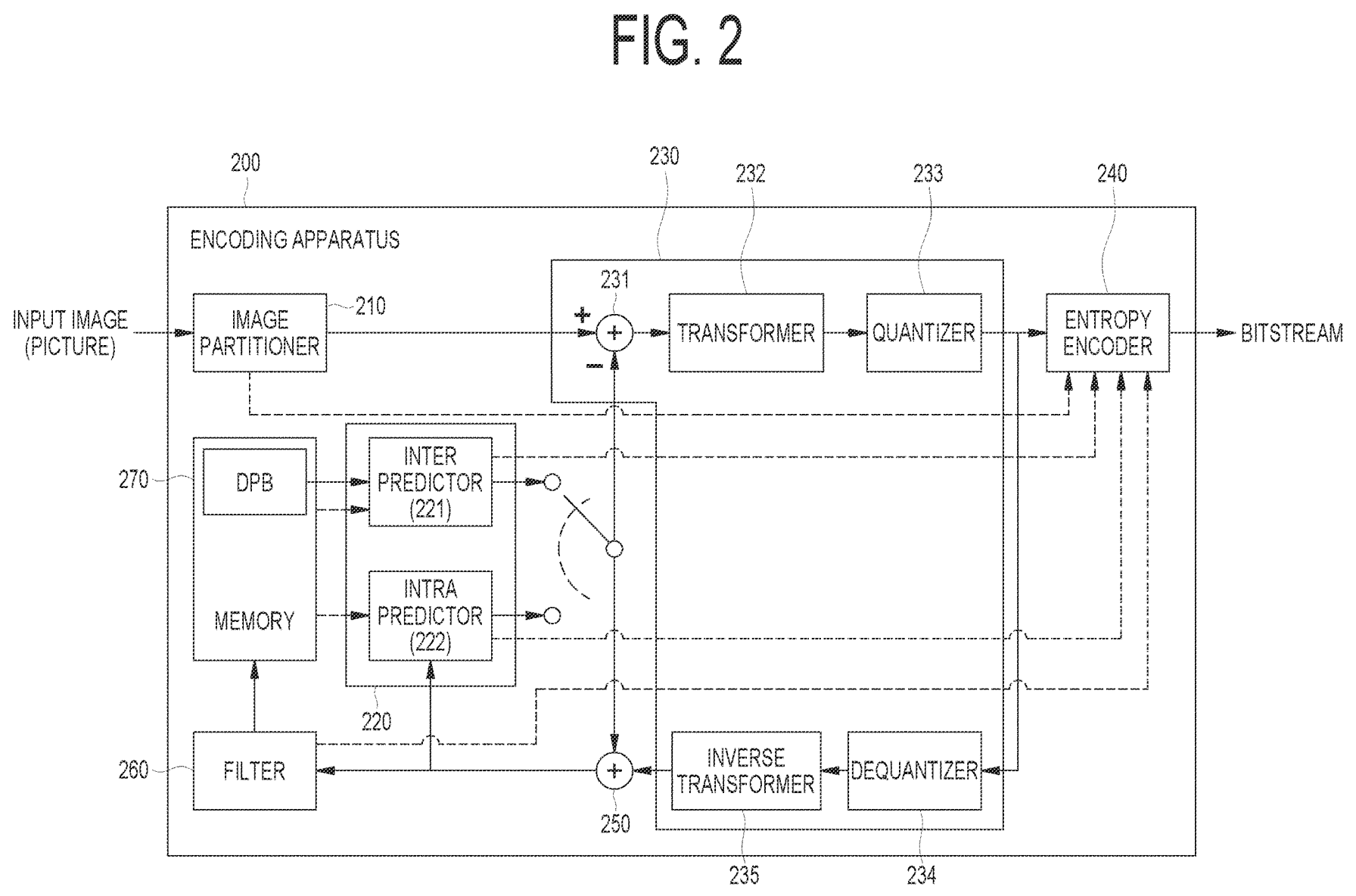

FIG. 2 is a diagram schematically illustrating a configuration of a video/image encoding apparatus to which embodiments of the present disclosure are applicable. Hereinafter, the video encoding apparatus may include an image encoding apparatus.

Referring to FIG. 2, an encoding apparatus 200 may include an image partitioner 210, a predictor 220, a residual processor 230, an entropy encoder 240), an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be referred to as a reconstructor or a reconstructed block generator. The image partitioner 210, the predictor 220, the residual processor 230, the entropy encoder 240, the adder 250, and the filter 260 may be configured as at least one hardware component (for example, an encoder chipset or processor) according to an embodiment. In addition, the memory 270 may include a decoded picture buffer (DPB) or may be configured as a digital storage medium. The hardware component may further include the memory 270 as an internal/external component.

The image partitioner 210 may partition an input image (or a picture or a frame) input to the encoding apparatus 200 into one or more processing units. For example, the processing unit may be referred to as a coding unit (CU). In this case, the CU may be recursively partitioned according to a quad-tree binary-tree ternary-tree (QTBTTT) structure from a CTU or a largest coding unit (LCU). For example, one CU may be partitioned into a plurality of CUs of a deeper depth based on a quad tree structure, a binary tree structure, and/or a ternary structure. In this case, for example, the quad tree structure may be applied first, and the binary tree structure and/or ternary structure may be applied later. Alternatively, the binary tree structure may be applied first. A coding procedure according to the present disclosure may be performed based on the final CU that is no longer partitioned. In this case, the LCU may be used as the final CU based on coding efficiency according to image characteristics. Alternatively, if necessary, the CU may be recursively partitioned into CUs of deeper depth, and thus a CU having an optimal size may be used as the final CU. Here, the coding procedure may include a procedure of prediction, transform, and reconstruction described below. As another example, the processor may further include a prediction unit (PU) or a transform unit (TU). In this case, the PU and the TU may be split or partitioned from the aforementioned final CU. The PU may be a unit of sample prediction, and the TU may be a unit for deriving a transform coefficient and/or a unit for deriving a residual signal from the transform coefficient.

The unit may be used interchangeably with terms such as a block or an area in some cases. In a general case, an M×N block may represent a set of samples or transform coefficients composed of M columns and N rows. A sample may generally represent a pixel or a value of a pixel, may represent only a pixel/pixel value of a luma component, or may represent only a pixel/pixel value of a chroma component. The "sample" may be used as a term corresponding to one picture (or image) for a pixel or pel.

The encoding apparatus 200 may subtract a prediction signal (predicted block or prediction sample array) output from the inter predictor 221 or the intra predictor 222 from an input image signal (original block or original sample array) to generate a residual signal (residual block or residual sample array), and the generated residual signal may be transmitted to the transformer 232. In this case, as shown, a unit that subtracts the prediction signal (prediction block or prediction sample array) from the input image signal (original block or original sample array) in the encoder 200 may be referred to as the subtractor 231. The predictor may perform prediction on a block to be processed (hereinafter referred to as a current block) and may generate a predicted block including prediction samples for the current block. The predictor may determine whether intra prediction or inter prediction is applied in a unit of a current block or CU. As described below in the description of each prediction mode, the predictor may generate various types of information on prediction such as prediction mode information and may transmit the generated information to the entropy encoder 240. The information on the prediction may be encoded in the entropy encoder 240 and output in the form of a bitstream.

The intra predictor 222 may predict a current block by referring to samples in a current picture. The referred samples may be located in the neighborhood of the current block or may be located apart according to a prediction mode. In intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of a prediction direction. However, this is merely an example, and more or less directional prediction modes may be used according to a setting. The intra predictor 222 may determine a prediction mode applied to the current block using a prediction mode applied to a neighboring block.

The inter predictor 221 may derive a predicted block for a current block based on a reference block (reference sample array) specified by a motion vector on a reference picture. In this case, in order to reduce an amount of motion information transmitted in an inter prediction mode, the motion information may be predicted in a unit of a block, a subblock, or a sample based on a correlation of motion information between a neighboring block and the current block. The motion information may include a motion vector and a reference picture index. The motion information may further include inter prediction direction (L0 prediction, L1 prediction, or Bi prediction) information. In the case of inter prediction, a neighboring block may include a spatial neighboring block present in a current picture and a temporal neighboring block present in a reference picture. A reference picture including the reference block and a reference picture including the temporal neighboring block may be the same or different. The temporal neighboring block may be referred to as a collocated reference block, a collocated CU (colCU), and the like, and the reference picture including the temporal neighboring block may be referred to as a collocated picture (colPic). For example, the inter predictor 221 may construct a motion information candidate list based on neighboring blocks and may generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the case of the skip mode, unlike the merge mode, a residual signal may not be transmitted. In the case of a motion vector prediction (MVP) mode, a motion vector of a neighboring block may be used as a motion vector predictor and a motion vector of a current block may be indicated by signaling a motion vector difference.

The predictor 220 may generate a prediction signal based on various prediction methods described below. For example, the predictor may apply not only intra prediction or inter prediction to predict one block but also simultaneously apply intra prediction and inter prediction. This may be referred to as combined inter and intra prediction (CIIP). In addition, for prediction of a block, the predictor may operate based on an intra block copy (IBC) prediction mode or a palette mode. The IBC prediction mode or the palette mode may be used for content image/video coding of a game or the like, for example, screen content coding (SCC). IBC basically performs prediction in a current picture but may be performed similarly to inter prediction in that a reference block is derived in the current picture. That is, the IBC may use at least one of inter prediction techniques described in the present disclosure. The palette mode may be regarded as an example of intra coding or intra prediction. When the palette mode is applied, sample values in a picture may be signaled based on information on a palette table and a palette index.

The prediction signal generated through the predictor (including the inter predictor 221 and/or the intra predictor 222) may be used to generate a reconstructed signal or a residual signal. The transformer 232 may generate transform coefficients by applying a transform technique to a residual signal. For example, the transform technique may include at least one of a discrete cosine transform (DCT), a discrete sine transform (DST), a karhunen-loeve transform (KLT), a graph-based transform (GBT), and a conditionally non-linear transform (CNT). Here, the GBT refers to a transform obtained from a graph when relationship information between pixels is represented by the graph. The CNT refers to a transform obtained based on a prediction signal generated using all previously reconstructed pixels. In addition, a transform process may be applied to pixel blocks having square shapes with the same size and may also be applied to variable-sized blocks other than a square shape.

The quantizer 233 may quantize transform coefficients and transmit the quantized transform coefficients to the entropy encoder 240. The entropy encoder 240 may encode a quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and may also generate information on the quantized transform coefficients based on the quantized transform coefficients in the one-dimensional vector form. The entropy encoder 240 may perform various encoding methods including, for example, exponential Golomb, context-adaptive variable length coding (CAVLC), and context-adaptive binary arithmetic coding (CABAC). In addition to the quantized transform coefficients, the entropy encoder 240 may encode information (for example, values of syntax elements) necessary for video/image reconstruction together or separately. The encoded information (for example, encoded video/image information) may be transmitted or stored in a NAL unit in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In the present disclosure, information and/or syntax elements transmitted/signaled from the encoding apparatus to the decoding apparatus may be included in the video/image information. The video/image information may be encoded through the above-described encoding procedure and included in the bitstream. The bitstream may be transmitted via a network or may be stored in a digital storage medium. Here, the network may include a broadcasting network and/or a communication network, and the digital storage medium may include various storage media such as a USB, an SD, a CD, a DVD, a Blue-ray disc, an HDD, and an SSD. A transmitter (not shown) transmitting a signal output from the entropy encoder 240 and/or a storage unit (not shown) storing the signal may be configured as internal/external elements of the encoding apparatus 200, and alternatively, the transmitter may also be included in the entropy encoder 240).

The quantized transform coefficients output from the quantizer 233 may be used to generate a prediction signal. For example, a residual signal (residual block or residual samples) may be reconstructed by applying dequantization and inverse transform to the quantized transform coefficients through the dequantizer 234 and the inverse transformer 235. The adder 250 may add the reconstructed residual signal to a prediction signal output from the inter predictor 221 or the intra predictor 222 to generate a reconstructed signal (reconstructed picture, reconstructed block, or reconstructed sample array). In the case of no residual for a block to be processed like a case in which a skip mode is applied, a predicted block may be used as a reconstructed block. The adder 250 may be referred to as a reconstructor or a reconstructed block generator. The generated reconstructed signal may be used for intra prediction of a next block to be processed in a current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to a reconstructed signal. For example, the filter 260 may generate a modified reconstructed picture by applying various filtering methods to a reconstructed picture and may store the modified reconstructed picture in the memory 270, specifically, in the DPB of the memory 270. The various filtering methods may include, for example, deblocking filtering, a sample adaptive offset (SAO), an adaptive loop filter, a bilateral filter, and the like. The filter 260 may generate various types of information related to the filtering and may transmit the generated information to the entropy encoder 240 as described below in the description of each filtering method. The information on the filtering may be encoded by the entropy encoder 240 and output in the form of a bitstream.

The modified reconstructed picture transmitted to the memory 270 may be used as a reference picture in the inter predictor 221. When inter prediction is applied through the encoding apparatus, prediction mismatch between the encoding apparatus 200 and the decoding apparatus 300 can be avoided, and encoding efficiency can be improved.

The DPB of the memory 270 may store the modified reconstructed picture for use as a reference picture in the inter predictor 221. The memory 270 may store motion information of a block, from which motion information in a current picture is derived (or encoded), and/or motion information of blocks in a picture that have already been reconstructed. The stored motion information may be transmitted to the inter predictor 221 to be used as motion information of a spatial neighboring block or motion information of a temporal neighboring block. The memory 270 may store reconstructed samples of reconstructed blocks in a current picture and may transmit the reconstructed samples to the intra predictor 222.

Figure 3:
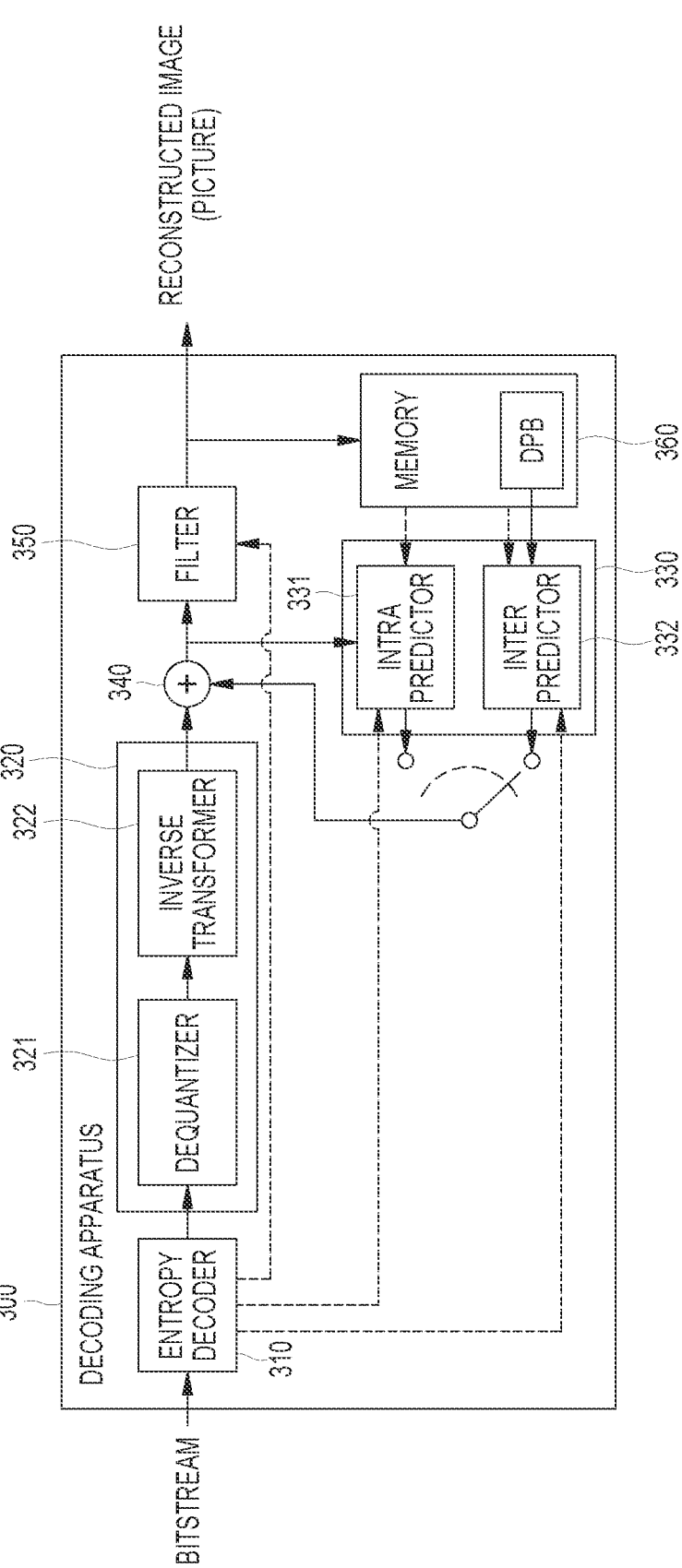
FIG. 3 is a diagram schematically illustrating a configuration of a video/image decoding apparatus to which embodiments of the present disclosure are applicable.

FIG. 3 is a diagram schematically illustrating a configuration of a video/image decoding apparatus to which embodiments of the present disclosure are applicable.

Referring to FIG. 3, a decoding apparatus 300 may include an entropy decoder 310, a residual processor 320, a predictor 330, an adder 340, a filter 350, and a memory 360. The predictor 330 may include an intra predictor 331 and an inter predictor 332. The residual processor 320 may include a dequantizer 321 and an inverse transformer 321. The entropy decoder 310, the residual processor 320, the predictor 330, the adder 340, and the filter 350 may be configured as one hardware component (for example, a decoder chipset or a processor) according to an embodiment. In addition, the memory 360 may include a DPB or may be formed of a digital storage medium. The hardware component may further include the memory 360 as an internal/external component.

When a bitstream including video/image information is input, the decoding apparatus 300 may reconstruct an image corresponding to a process in which video/image information is processed in the encoding apparatus of FIG. 2. For example, the decoding apparatus 300 may derive units/blocks based on block partition-related information obtained from the bitstream. The decoding apparatus 300 may perform decoding using a processing unit applied in the encoding apparatus. Thus, the processing unit for decoding may be a CU, for example, and the CU may be partitioned from a CTU or an LCU according to a quad tree structure, a binary tree structure, and/or a ternary tree structure. One or more transform units may be derived from the CU. A reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (for example, video/image information) necessary for image reconstruction (or picture reconstruction). The video/image information may further include information on various parameter sets such as an APS, a PPS, an SPS, or a VPS. In addition, the video/image information may further include general constraint information. The decoding apparatus may further decode a picture based on the information on the parameter set and/or the general constraint information. Signaled/received information and/or syntax elements to be described below in the present disclosure may be decoded through such a decoding procedure and obtained from the bitstream. For example, the entropy decoder 310 may decode information in the bitstream based on a coding method such as exponential Golomb coding, CAVLC, CABAC, or the like and may output values of syntax elements required for image reconstruction and quantized values of transform coefficients regarding a residual. More specifically, in a CABAC entropy decoding method, a bin corresponding to each syntax element in a bitstream may be received, a context model may be determined using decoding target syntax element information and decoding information of a neighboring and decoding target block or information of a symbol/bin decoded in a previous stage, a probability that a bin occurs may be predicted according to the determined context model, arithmetic decoding may be performed on the bin, and a symbol corresponding to a value of each syntax element may be generated. In this case, in the CABAC entropy decoding method, after the context model is determined, the context model may be updated using information of a symbol/bin decoded for a context model of a next symbol/bin. Information on prediction among information decoded in the entropy decoder 310 may be provided to the predictor (inter predictor 332 and intra predictor 331). A residual value on which entropy decoding has been performed in the entropy decoder 310, that is, quantized transform coefficients and related parameter information, may be input to the residual processor 320. The residual processor 320 may derive a residual signal (residual block, residual samples, or residual sample array). In addition, information on filtering among the information decoded in the entropy decoder 310 may be provided to the filter 350. Meanwhile, a receiver (not shown) for receiving a signal output from the encoding apparatus may be further configured as an internal/external element of the decoding apparatus 300, or the receiver may also be a component of the entropy decoder 310. Meanwhile, the decoding apparatus according to the present disclosure may be referred to as a video/image/picture decoding apparatus, and the decoding apparatus may also be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340), the filter 350, and the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block. In this case, the rearrangement may be performed based on a coefficient scanning order performed in the encoding apparatus. By using a quantization parameter (for example, quantization step size information), the dequantizer 321 may perform dequantization on the quantized transform coefficients and may obtain transform coefficients.

The inverse transformer 322 inversely transforms the transform coefficients to obtain a residual signal (residual block or residual sample array).

The predictor may perform prediction on a current block and may generate a predicted block including prediction samples for the current block. The predictor may determine whether intra prediction or inter prediction is applied to the current block based on information on the prediction output from the entropy decoder 310 and may determine a specific intra/inter prediction mode.

The predictor 320 may generate a prediction signal based on various prediction methods described below. For example, the predictor may apply not only intra prediction or inter prediction to predict one block but also simultaneously apply intra prediction and inter prediction. This may be referred to as CIIP. In addition, for prediction of a block, the predictor may operate based on an IBC prediction mode or a palette mode. The IBC prediction mode or the palette mode may be used for content image/video coding of a game or the like, for example, SCC. IBC basically performs prediction in a current picture but may be performed similarly to inter prediction in that a reference block is derived in the current picture. That is, the IBC may use at least one of inter prediction techniques described in the present disclosure. The palette mode may be regarded as an example of intra coding or intra prediction. When the palette mode is applied, information on a palette table and a palette index may be included in the video/image information and may be signaled.

The intra predictor 331 may predict a current block by referring to samples in a current picture. The referred samples may be located in the neighborhood of the current block or may be located apart according to a prediction mode. In intra prediction, prediction modes may include a plurality of non-directional modes and a plurality of directional modes. The intra predictor 331 may determine the prediction mode applied to the current block using a prediction mode applied to a neighboring block.

The inter predictor 332 may derive a predicted block for a current block based on a reference block (reference sample array) specified by a motion vector on a reference picture. In this case, in order to reduce the amount of motion information transmitted in the inter prediction mode, motion information may be predicted in a unit of a block, a subblock, or a sample based on a correlation of motion information between a neighboring block and the current block. The motion information may include a motion vector and a reference picture index. The motion information may further include inter prediction direction (L0 prediction, L1 prediction, or Bi prediction) information. In the case of inter prediction, a neighboring block may include a spatial neighboring block present in a current picture and a temporal neighboring block present in a reference picture. For example, the inter predictor 332 may construct a motion information candidate list based on neighboring blocks and may derive a motion vector of the current block and/or a reference picture index based on received candidate selection information. Inter prediction may be performed based on various prediction modes, and information on the prediction may include information indicating a mode of inter prediction for the current block.

diction may include information indicating a mode of inter prediction for the current block.

The adder 340 may generate a reconstructed signal (reconstructed picture, reconstructed block, or reconstructed sample array) by adding the obtained residual signal to the prediction signal (predicted block or predicted sample array) output from the predictor (including the inter predictor 332 and/or the intra predictor 331). In the case of no residual for a block to be processed like a case in which a skip mode is applied, a predicted block may be used as a reconstructed block.

The adder 340 may be referred to as a reconstructor or a reconstructed block generator. The generated reconstructed signal may be used for intra prediction of a next block to be processed in a current picture, may be output through filtering as described below; or may be used for inter prediction of a next picture.

Meanwhile, LMCS may be applied in a picture decoding process.

The filter 350 may improve subjective/objective image quality by applying filtering to a reconstructed signal. For example, the filter 350 may generate a modified reconstructed picture by applying various filtering methods to a reconstructed picture and may store the modified reconstructed picture in the memory 360, specifically, in the DPB of the memory 360. The various filtering methods may include, for example, deblocking filtering, a SAO, an adaptive loop filter, a bilateral filter, and the like.

The (modified) reconstructed picture stored in the DPB of the memory 360 may be used as a reference picture in the inter predictor 332. The memory 360 may store motion information of a block, from which motion information in a current picture is derived (or decoded), and/or motion information of blocks in a picture that have already been reconstructed. The stored motion information may be transmitted to the inter predictor 260 so as to be utilized as motion information of a spatial neighboring block or motion information of a temporal neighboring block. The memory 360 may store reconstructed samples of reconstructed blocks in a current picture and may transmit the reconstructed samples to the intra predictor 331.

In the present disclosure, the embodiments described in the filter 260, inter predictor 221, and intra predictor 222 of the encoding apparatus 200 may be equally or correspondingly applied to the filter 350, the inter predictor 332, and the intra predictor 331 of the decoding apparatus 300, respectively.

As described above, in performing video coding, prediction is performed to increase compression efficiency. Through this, it is possible to generate a predicted block including prediction samples for a current block, which is a block to be coded. Here, the predicted block includes prediction samples in a spatial domain (or a pixel domain). The predicted block is derived in the same way from the encoding apparatus and the decoding apparatus. The encoding apparatus can increase image coding efficiency by signaling information (residual information) between an original block and the predicted block to the decoding apparatus, not an original sample value of the original block itself. The decoding apparatus may derive a residual block including residual samples based on the residual information, may combine the residential block with the predicted block to generate a reconstructed block including reconstructed samples, and may generate a reconstructed picture including reconstructed blocks.

The residual information may be generated through transform and quantization procedures. For example, the encoding apparatus may derive a residual block between the original block and the predicted block, may derive transform coefficients by performing a transform procedure on the residual samples (residual sample array) included in the residual block, may derive quantized transform coefficients by performing a quantization procedure on the transform coefficients, and may signaling related residual information (through a bitstream) to the decoding apparatus. Here, the residual information may include information such as value information, position information, transform technique, transform kernel, quantization parameter, and the like of the quantized transform coefficients. The decoding apparatus may perform a dequantization/inverse transform procedure based on the residual information and may derive residual samples (or residual blocks). The decoding apparatus may generate a reconstructed picture based on the predicted block and the residual block. The encoding apparatus may also derive a residual block by dequantizing/inversely transforming quantized transform coefficients for reference to inter prediction of a picture and may generate a reconstructed picture based thereon.

Intra prediction may refer to prediction for generating prediction samples for a current block based on reference samples in a picture (hereinafter referred to as current picture) to which the current block belongs. When intra prediction is applied to a current block, neighboring reference samples to be used for intra prediction of the current block may be derived. The neighboring reference samples of the current block may include a sample neighboring a left boundary of a current block with a size of nW×nH, a total of 2×nH samples neighboring a bottom-left of the current block, a sample neighboring a top boundary of the current block, a total of 2×nW samples neighboring a top-right of the current block, and one sample neighboring a top-left of the current block. Alternatively, the neighboring reference samples of the current block may also include a plurality of columns of top neighboring samples and a plurality of rows of left neighboring samples. In addition, the neighboring reference samples of the current block may also include a total of nH samples neighboring a right boundary of a current block with a size of nW×nH, a total of nW samples neighboring a bottom boundary of the current block, a total of nW samples neighboring a bottom boundary of the current block, and one sample neighboring a bottom right of the current block.

However, some of the neighboring reference samples of the current block may not have been decoded yet or may not be available. In this case, a decoder may substitute unavailable samples with available samples and may construct neighboring reference samples to be used for prediction. Alternatively, neighboring reference samples to be used for prediction may be constructed through interpolation of available samples.

When neighboring reference samples are derived. (i) a prediction sample may be derived based on an average or interpolation of the neighboring reference samples of a current block, and (ii) among the neighboring reference samples of the current block, the prediction sample may be derived based on a reference sample that is present in a specific (prediction) direction with respect to the prediction sample. Case (i) may be referred to as a non-directional mode or non-angular mode, and case (ii) may be referred to as a directional mode or angular mode.

In addition, on the basis of a prediction sample of the current block among the neighboring reference samples, through interpolation between a first neighboring sample positioned in a prediction direction of an intra prediction mode of the current block and a second neighboring sample positioned in a direction opposite to the prediction direction, the prediction sample may be generated. Such a case may be referred to as linear interpolation intra prediction (LIP). In addition, by using a linear model, chroma prediction samples may be generated based on luma samples. Such a case may be referred to as an LM mode.

In addition, a temporary prediction sample of the current block may be derived based on filtered neighboring reference samples, and a prediction sample of the current block may also be derived by weighted summing the temporary prediction sample and at least one reference sample derived according to the intra prediction mode among the existing neighboring reference samples, that is, unfiltered neighboring reference samples. Such a case may be referred to as position dependent intra prediction (PDPC).

In addition, a reference sample line with the highest prediction accuracy among neighboring multi-reference sample lines of the current block may be selected and a prediction sample may be derived using a reference sample located in a prediction direction from the selected line, and in this case, intra prediction encoding may be performed by indicating (signaling) the used reference sample line to the decoding apparatus. Such a case may be referred to as multi-reference line intra prediction or MRL-based intra prediction.

In addition, the current block may be divided into vertical or horizontal sub-partitions, and intra prediction may be performed based on the same intra prediction mode, wherein neighboring reference samples may be derived and used in units of the sub-partitions. That is, in this case, the intra prediction mode for the current block may be equally applied to the sub-partitions, wherein intra prediction performance can be increased in some cases by deriving and using the neighboring reference samples in units of the sub-partitions. Such a prediction method may be referred to as intra prediction based on intra sub-partitions (ISPs).

The above-described intra prediction methods may be referred to as intra prediction types to be distinguished from an intra prediction mode. The intra prediction types may be referred to by various terms such as intra prediction techniques or additional intra prediction modes. For example, the intra prediction types (or additional intra prediction modes or the like) may include at least one of the above-described LIP, PDPC, MRL, and ISP. A general intra prediction method excluding specific intra prediction types such as the LIP, PDPC, MRL, ISP, etc., may be referred to as a normal intra prediction type. The normal intra prediction type may be generally applied when the above specific intra prediction type is not applied, and prediction may be performed based on the above-described intra prediction mode. Meanwhile, if necessary, post-filtering on the derived prediction sample may be performed.

Specifically, an intra prediction procedure may include an intra prediction mode/type determination operation, a neighboring reference sample derivation operation, and an intra prediction mode/type-based prediction sample derivation operation. In addition, if necessary, a post-filtering operation on the derived prediction sample also may be performed.

When intra prediction is applied, an intra prediction mode applied to a current block may be determined using an intra prediction mode of a neighboring block. For example, the decoding apparatus may select one of most probable mode (MPM) candidates in an MPM list derived based on additional candidate modes and an intra prediction mode of a neighboring block (for example, a left and/or top neighboring block) of a current block based on the received MPM index or may select one of the remaining intra prediction modes not included in the MPM candidates (and a planar mode) based on remaining intra prediction mode information. The MPM list may be configured to include or not include a planner mode as a candidate. For example, when the MPM list includes the planner mode as a candidate, the MPM list may have 6 candidates, and when the MPM list does not include the planner mode as a candidate, the MPM list may have 5 candidates. When the MPM list does not include the planar mode as a candidate, a not planar flag (for example, intra_luma_not_planar_flag) indicating that an intra prediction mode of a current block is not the planar mode may be signaled. For example, an MPM flag may be signaled first, and when a value of the MPM flag is 1, an MPM index and a not planner flag may be signaled. In addition, when a value of the not planner flag is 1, the MPM index may be signaled. Here, a reason why the MPM list is constructed to not include the planner mode as a candidate is to, since the planner mode is always considered as an MPM rather than that the planner mode is not the MPM, signal the not planar flag first and check whether it is the planar mode in advance.

For example, whether the intra prediction mode applied to the current block is among the MPM candidates (and the planar mode) or the remaining modes may be indicated based on the MPM flag (for example, intra_luma_mpm-_flag). The MPM flag having a value of 1 may indicate that the intra prediction mode for the current block is present in the MPM candidates (and the planar mode), and the MPM flag having a value of 0 may indicate that the intra prediction mode for the current block is not present in the MPM candidates (and the planar mode). The not planar flag (for example, intra luma_not_planar_flag) having a value of 0 may indicate that the intra prediction mode for the current block is a planar mode, and the not planar flag having a value of 1 may indicate that the intra prediction mode for the current block is not the planar mode. The MPM index may be signaled in the form of an mpm_idx or intra_lu-ma_mpm_idx syntax element, and the remaining intra prediction mode information may be signaled in the form of a rem_intra_luma_pred_mode or intra_luma_mpm_remain-der syntax element. For example, the remaining intra prediction mode information may indicate one of the remaining intra prediction modes not included in the MPM candidates (and planar mode) among all intra prediction modes by indexing the remaining intra prediction modes in the order of prediction mode number. The intra prediction mode may be an intra prediction mode for a luma component (sample). Hereinafter, the intra prediction mode information may include at least one of the MPM flag (for example, intra_lu-ma_mpm_flag), the not planar flag (for example, intra_lu-ma_not_planar_flag), the MPM index (for example, mpm_idx or intra_luma_mpm_idx), and the remaining intra prediction mode information (rem_intra_luma_pred_mode or intra_luma_mpm_reminder). In the present disclosure, the MPM list may be referred to by various terms such as an MPM candidate list and candModeList. When matrix-based intra prediction (MIP) is applied to a current block, a separate MPM flag (for example, intra_mip_mpm_flag) for MIP, an MPM index (for example, intra_mip_mpm_idx), and remaining intra prediction mode information (for example, intra_mip_mpm_remainder) may be signaled, and the not planar flag may not be signaled.

In other words, in general, when a block partition is performed on an image, a current block to be coded and a neighboring block have similar image characteristics. Therefore, there is a high probability that the current block and the neighboring block have the same or similar intra prediction mode. Accordingly, an encoder may use an intra prediction mode of the neighboring block to encode an intra prediction mode of the current block.

For example, the encoder/decoder may construct an MPM list for a current block. The MPM list may also be referred to as an MPM candidate list. Here, an MPM may refer to a mode used to improve coding efficiency in consideration of the similarity between a current block and a neighboring block during intra prediction mode coding. As described above, the MPM list may be constructed to include the planar mode or may be constructed by excluding the planar mode. For example, when the MPM list includes the planar mode, the number of candidates in the MPM list may be 6. When the MPM list does not include the planar mode, the number of candidates in the MPM list may be 5.

The encoder/decoder may construct an MPM list including 5 or 6 MPMs.

In order to construct the MPM list, three types of modes of default intra modes, neighboring intra modes, and derived intra modes may be considered.

For the neighboring intra modes, two neighboring blocks, that is, a left neighboring block and a top neighboring block, may be considered.

As described above, when the MPM list is constructed to not include the planner mode, the planar mode may be excluded from the list, and the number of MPM list candidates may be set to 5.

In addition, among intra prediction modes, a non-directional mode (or a non-angular mode) may include a DC mode based on an average of neighboring reference samples of a current block or a planar mode based on interpolation.

When inter prediction is applied, the predictor of the encoding apparatus/decoding apparatus may perform inter prediction in a block unit and may derive a prediction sample. The inter prediction may represent a prediction derived in a manner that is dependent on data elements (for example, sample values or motion information) of a picture (s) other than the current picture. When the inter prediction is applied to a current block, a predicted block (prediction sample array) for the current block may be derived based on a reference block (reference sample array) specified by a motion vector on a reference picture indicated by a reference picture index. In this case, in order to reduce an amount of motion information transmitted in an inter prediction mode, motion information of the current block may be predicted in a unit of a block, a subblock, or a sample based on a correlation of motion information between a neighboring block and the current block. The motion information may include a motion vector and a reference picture index. The motion information may further include inter prediction type (L0 prediction, L1 prediction, or Bi prediction) information. When the inter prediction is applied, the neighboring block may include a spatial neighboring block present in the current picture and a temporal neighboring block present in the reference picture. A reference picture including the reference block and a reference picture including the temporal neighboring block may be the same or different. The temporal neighboring block may be referred to as a collocated reference block, a collocated CU (colCU), or the like, and the reference picture including the temporal neighboring block may also be referred to as a collocated picture (colPic). For example, a motion information candidate list may be constructed based on neighboring blocks of the current block and a flag or index information indicating which candidate is selected (used) may be signaled in order to derive a motion vector and/or reference picture index of the current block. The inter prediction may be performed based on various prediction modes, and for example, in the case of a skip mode and a merge mode, the motion information of the current block may be the same as motion information of a selected neighboring block. In the case of the skip mode, unlike the merge mode, a residual signal may not be transmitted. In the case of an MVP mode, the motion vector of the selected neighboring block may be used as a motion vector predictor, and a motion vector difference may be signaled. In this case, the motion vector of the current block may be derived using the sum of the motion vector predictor and the motion vector difference.

The motion information may further include L0 motion information and/or L1 motion information according to an inter prediction type (L0 prediction, L1 prediction, Bi prediction, or the like). An L0-direction motion vector may be referred to as an L0 motion vector or MVL0, and an L1-direction motion vector may be referred to as an L1 motion vector or MVL1. Prediction based on the L0 motion vector may be referred to as L0 prediction, prediction based on the L1 motion vector may be referred to as L1 prediction, and prediction based on both the L0 motion vector and the L1 motion vector may be referred to as bi-prediction. Here, the L0 motion vector may represent a motion vector associated with a reference picture list L0, and the L1 motion vector may represent a motion vector associated with a reference picture list L1. The reference picture list L0 may include pictures, which are prior to the current picture in an output order, as reference pictures, and the reference picture list L1 may include pictures, which are subsequent to the current picture in the output order, as reference pictures. The prior pictures may be referred to as a forward (reference) pictures, and the subsequent pictures may be referred to as reverse (reference) pictures. The reference picture list L0 may further include the pictures, which are subsequent to the current picture in the output order, as the reference pictures. In this case, the prior pictures may be first indexed in the reference picture list L0, and the subsequent pictures may then be indexed. The reference picture list L1 may further include the pictures previous to the current picture in the output order, as the reference pictures. In this case, the subsequent pictures may be first indexed in the reference picture list L1, and the previous pictures may then be indexed. Here, the output order may correspond to a picture order count (POC) order.

Figure 4:
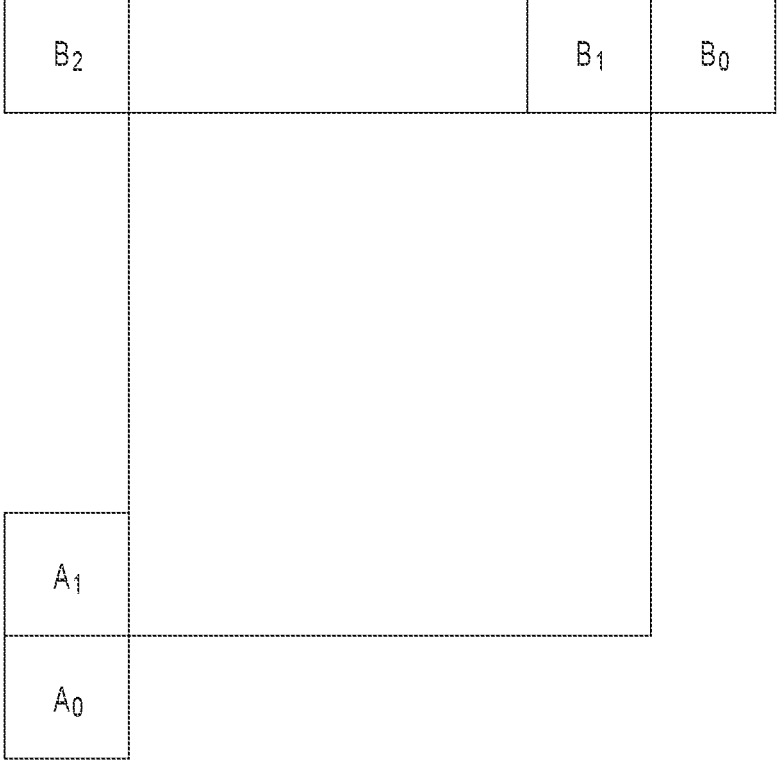
FIG. 4 is a diagram for describing a method of deriving motion information through an inter prediction mode.

FIG. 4 is a diagram for describing a method of deriving motion information through an inter prediction mode. Here, among inter prediction modes, a merge mode, an MVP mode (or advanced motion vector prediction (AMVP)), a pairwise average merge mode, and a history-based MVP (HMVP) mode will be described.

When the merge mode is applied, motion information of a current prediction block is not directly transmitted, and the motion information of the current prediction block is derived using motion information of a neighboring prediction block. Accordingly, the motion information of the current prediction block may be indicated by transmitting flag information indicating that the merge mode has been used and a merge index indicating which neighboring prediction block has been used.

In order to perform the merge mode, the encoder should search for merge candidate blocks used to derive the motion information of the current prediction block. For example, up to five merge candidate blocks may be used, but the present disclosure is not limited thereto. In addition, the maximum number of the merge candidate blocks may be transmitted in a slice header, a tile group header, or a parameter set (for example, an SPS), and the present disclosure is not limited thereto. After the merge candidate blocks are found, the encoder may generate a merge candidate list and may select a merge candidate block having a lowest cost among the merge candidate blocks as a final merge candidate block.

The present disclosure provides various embodiments of the merge candidate blocks constituting the merge candidate list.

In the merge candidate list, for example, five merge candidate blocks may be used. For example, four spatial merge candidates and one temporal merge candidate may be used. As a specific example, in the case of the spatial merge candidate, the blocks shown in FIG. 4 may be used as spatial merge candidates.

The merge candidate list for the current block may be constructed, for example, based on the following procedure.

A coding apparatus (encoder/decoder) searches for spatial neighboring blocks of a current block and inserts derived spatial merge candidates into a merge candidate list. For example, the spatial neighboring blocks may include a bottom-left corner neighboring block, a left neighboring block, a top-right corner neighboring block, a top neighboring block, and a top-left corner neighboring block of the current block. However, this is merely an example, and in addition to the spatial neighboring blocks described above, additional neighboring blocks such as a right neighboring block, a bottom neighboring block, and a bottom-right neighboring block may be further used as the spatial neighboring blocks. The coding apparatus may detect available blocks by searching for the spatial neighboring blocks based on priority and may derive motion information of the detected blocks as the spatial merge candidates. For example, the encoder and decoder may search for five blocks shown in FIG. 4 in the order of A1, B1, B0, A0, and B2, may sequentially index available candidates and may construct the merge candidate list.

The coding apparatus inserts temporal merge candidates, which is derived by searching for temporal neighboring blocks of the current block, into the merge candidate list. The temporal neighboring blocks may be located on a reference picture that is a picture different from a current picture on which the current block is located. The reference picture on which the temporal neighboring blocks are located may be referred to as a collocated picture or a col picture. The temporal neighboring blocks may be searched for in the order of a bottom-right corner neighboring block and a bottom-right center block of a collocated block for the current block on the col picture. Meanwhile, when motion data compression is applied, specific motion information may be stored as representative motion information for each certain storage unit in the col picture. In this case, it is not necessary to store motion information on all blocks in the certain storage unit, and through this a motion data compression effect can be obtained. In this case, the certain storage unit may be predetermined, for example, in a 16×16 sample unit or an 8×8 sample unit, or size information on the certain storage unit may be signaled from the encoder to the decoder. When the motion data compression is applied, motion information of the temporal neighboring block may be substituted with the representative motion information of the certain storage unit in which the temporal neighboring block is located. That is, in this case, in terms of implementation, the temporal merge candidate may be derived based on, rather than a prediction block located at coordinates of the temporal neighboring block, motion information of a prediction block covering an arithmetic left-shifted position after an arithmetic right shift by a certain value based on coordinates (top-left sample position) of the temporal neighboring block. For example, when the certain storage unit is a 2n×2n sample unit and the coordinates of the temporal neighboring block are (xTnb, yTnb), motion information of a prediction block located at a modified position ((xTnb>>n)<<n), (vTnb>>n)<<n)) may be used for the temporal merge candidate. Specifically, for example, when the certain storage unit is a 16×16 sample unit and the coordinates of the temporal neighboring block are (xTnb, yTnb), motion information of a prediction block located at a modified position ((xTnb>>4)<<4), (vTnb>>4)<<4)) may be used for the temporal merge candidate. Alternatively, for example, when the certain storage unit is an 8×8 sample unit and the coordinates of the temporal neighboring block are (xTnb, yTnb), motion information of a prediction block located at a modified position ((xTnb>>3)<<3), (vTnb>>3)<<3)) may be used for the temporal merge candidate.

The coding apparatus may check whether the number of current merge candidates is smaller than the number of maximum merge candidates (maximum number of candidates included in the merge candidate list). The number of the maximum merge candidates may be predetermined or may be signaled from the encoder to the decoder (for example, via a group header or SPS). For example, the encoder may generate and encode information on the number of the maximum merge candidates (maximum number of candidates included in the merge candidate list) and may transmit the information to the decoder in the form of a bitstream. When the number of the maximum merge candidates is satisfied, a subsequent candidate addition process may not be performed.

As a result of the check, when the number of the current merge candidates is smaller than the number of the maximum merge candidates, the coding apparatus inserts additional merge candidates into the merge candidate list. The additional merge candidate may include, for example, an advanced temporal motion vector prediction (ATMVP) merge candidate, a combined bi-predictive merge candidate (when a type of a current slice/slice of a tile group/tile group is a B type), and/or a zero vector merge candidate.

As a result of the check, when the number of the current merge candidates is not smaller than the number of the maximum merge candidates, the coding apparatus may terminate the construction of the merge candidate list. In this case, the encoder may select an optimal merge candidate among merge candidates constructing the merge candidate list based on a rate-distortion (RD) cost and may signal selection information (for example, a merge index) indicating the selected merge candidate to the decoder. The decoder may select the optimal merge candidate based on the merge candidate list and the selection information.

As described above, motion information of the selected merge candidate may be used as motion information of the current block, and prediction samples of the current block may be derived based on the motion information of the current block. The encoder may derive residual samples of the current block based on the prediction samples and may signal residual information on the residual samples to the decoder. As described above, the decoder may generate reconstructed samples based on the prediction samples and the residual samples derived based on the residual information and may generate a reconstructed picture based on the generated reconstructed samples.

When a skip mode is applied, the motion information of the current block may be derived in the same manner as in a case in which the merge mode is applied above. However, when the skip mode is applied, a residual signal for a corresponding block may be omitted, and thus the prediction samples may be directly used as the reconstructed samples.

When an MVP mode is applied, a motion vector predictor (mvp) candidate list may be generated using a motion vector of a reconstructed spatial neighboring block (for example, it may be the neighboring block shown in FIG. 4) and/or a motion vector corresponding to a temporal neighboring block (or a col block). That is, the motion vector of the reconstructed spatial neighboring block and/or the motion vector corresponding to the temporal neighboring block may be used as mvp candidates. When bi-prediction is applied, an mvp candidate list for deriving L0 motion information and an mvp candidate list for deriving L1 motion information may be separately generated and used. The above-described prediction information (or information on prediction) may include selection information (for example, an MVP flag or MVP index) indicating an optimal mvp candidate selected from the mvp candidates included in the list. In this case, by using the selection information, the predictor may select an mvp of a current block from the mvp candidates included in a motion vector candidate list. The predictor of the encoding apparatus may obtain a motion vector difference (MVD) between the motion vector and the mvp of the current block and may encode the MVD and may output it in the form of a bitstream. That is, the MVD may be obtained by subtracting the mvp from the motion vector of the current block. In this case, the predictor of the decoding apparatus may obtain an MVD included in information on the prediction and may derive the motion vector of the current block by adding the MVD and the mvp. The predictor of the decoding apparatus may obtain or derive a reference picture index indicating a reference picture from the information on the prediction.

In a procedure of deriving history-based merge candidates, HMVP merge candidates may added to a merge list after spatial MVP and TMVP are inserted. Here, motion information of a previously coded block is stored in a table and used as MVP for a current CU. A table including a plurality of HMVP candidates is maintained during an encoding/decoding procedure. When a new CTU row is found, the table may be reset (for example, emptied). For inter-coded CU rather than a subblock, related motion information is added to the last entry of the table as a new HMVP candidate.

An HMVP table size S may be set to 6, which indicates that up to 6 HMVP candidates may be added to the table. When a new motion candidate is inserted to the table, a constrained first-in-first-out (FIFO) rule is used, and herein, redundancy check is applied to find whether there is an identical HMVP in the table. When found, the identical HMVP may be removed from the table, and then all the HMVP candidates may be moved forward.

The HMVP candidates may be used in a procedure of constructing a merge candidate list. The latest several HMVP candidates in the table are checked in order and inserted into the candidate list after a TMVP candidate. Redundancy check is applied to a spatial or temporal merge candidate from the HMVP candidates.

In order to reduce the number of redundancy check operations, the following procedure may be performed.

1) The number of HMPV candidates used to generate a merge list is set to (N<=4)?M:(8−N), wherein N denotes the number of existing candidates in the merge list, and M denotes the number of available HMVP candidates in a table.

2) When the total number of available merge candidates reaches a value obtained by subtracting 1 from the maximum number of allowable merge candidates, a procedure of constructing a merge candidate list of HMVP is terminated.

In a procedure of deriving pairwise average candidates, the pairwise average candidates are generated by averaging predetermined pairs of candidates in an existing merge candidate list, and the predetermined pairs are defined as {(0, 1), (0, 2), (1, 2), (0, 3), (1, 3), (2, 3)}. Here, numbers denote merge indices for a merge candidate list. Averaged motion vectors are calculated separately for each reference list. When two motion vectors are available in one list, the two motion vectors may be averaged even when pointing to different reference pictures. When only one motion vector is available, one motion vector may be used directly. When there is no available motion vector, the list is treated as being invalid.

When the merge list is not full after pairwise average merge candidates are added, zero MVP may be inserted into the list until the maximum number of merge candidates is reached.

Meanwhile, in the past, only one motion vector could be used to express the motion of a coding block. That is, a translation motion model could be used. However, although such a method may express an optimal motion in a block unit, the optimal motion is not actually an optimal motion of each sample. When an optimal motion vector may be determined in a sample unit, coding efficiency can be improved. To this end, an affine motion model may be used. An affine motion prediction method of performing coding using the affine motion model may be as follows.

The affine motion prediction method may express a motion vector in a unit of each sample of a block using two, three, or four motion vectors. For example, the affine motion model may express four motions. An affine motion model that expresses three motions (translation, scale, and rotation) among motions which may be expressed by the affine motion model may be referred to as a similarity (or simplified) affine motion model. However, the affine motion model is not limited to the above-described motion model.

Figure 5A:
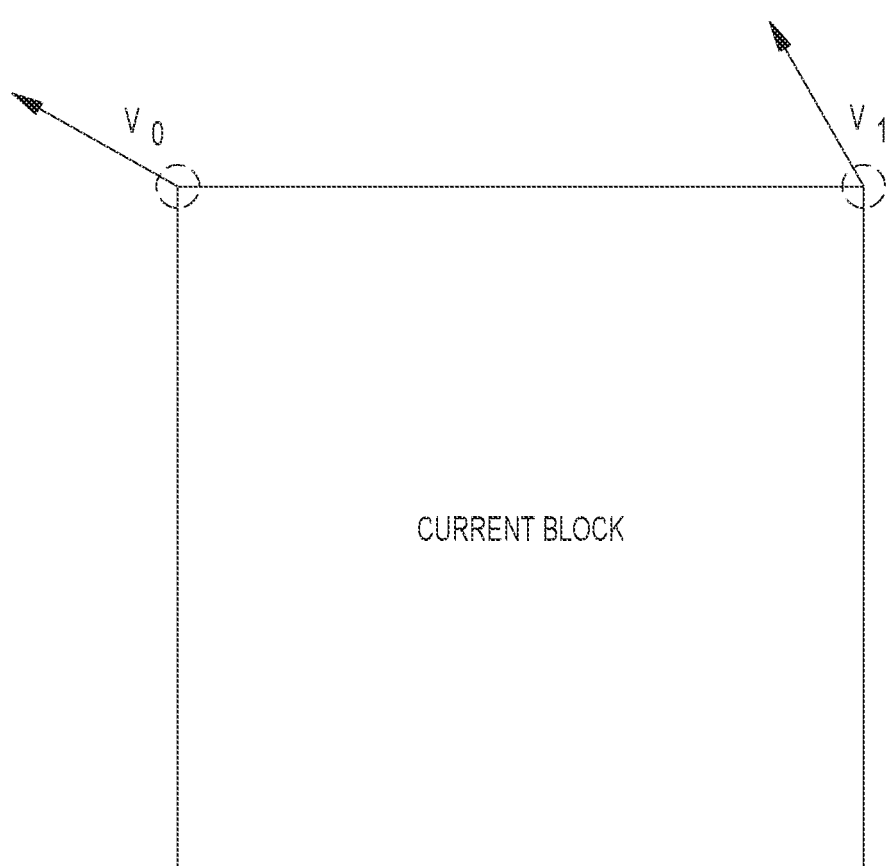
FIGS. 5A and 5B exemplarily illustrate a control point motion vector (CPMV) for affine motion prediction.
Figure 5B:
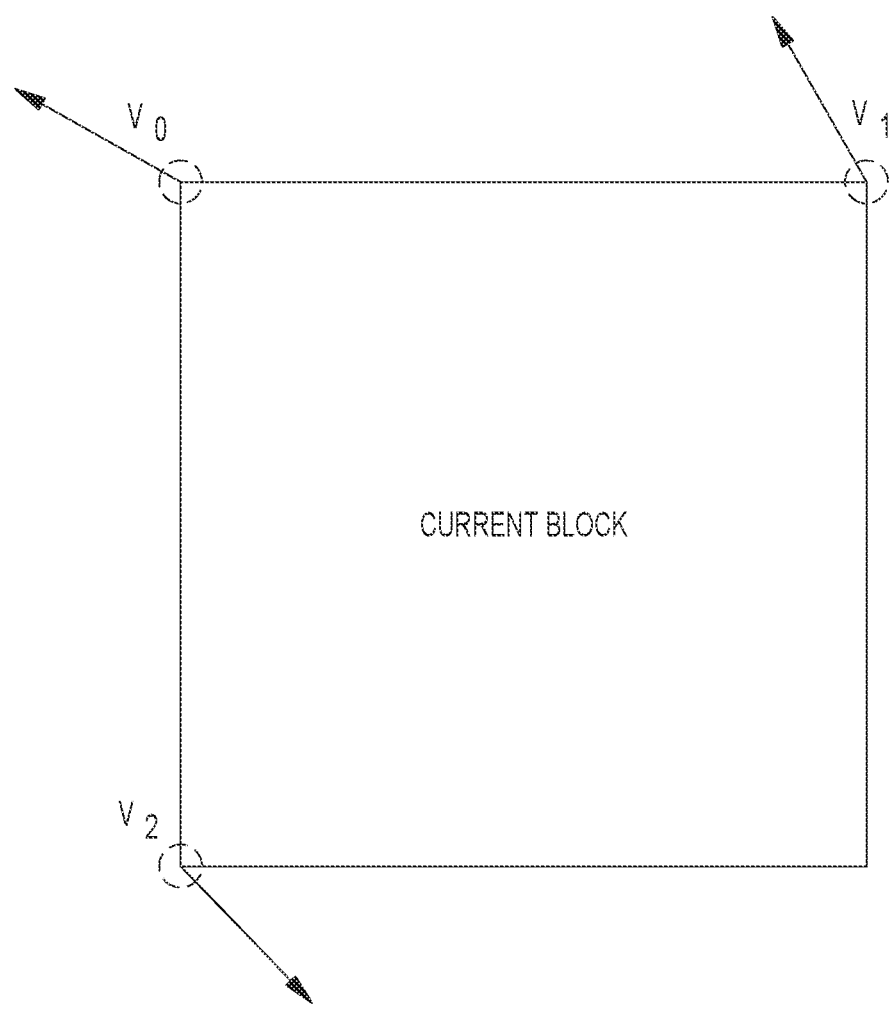

FIGS. 5A and 5B exemplarily illustrate a control point motion vector (CPMV) for affine motion prediction.

In affine motion prediction, a motion vector at a position of a sample included in a block may be determined using two or more CPMVs. In this case, a set of motion vectors may be indicated as an affine motion vector field (MVF).

For example, FIG. 5A illustrates a case in which two CPMVs are used, which may be referred to as a 4-parameter affine model. In this case, a motion vector at an (x, y) sample position may be determined, for example, by Equation 1.

$$\begin{cases} mv_x = \dfrac{mv_{1x} - mv_{0x}}{W}x + \dfrac{mv_{1y} - mv_{0y}}{W}y + mv_{0x} \\ mv_y = \dfrac{mv_{1y} - mv_{0y}}{W}x + \dfrac{mv_{1x} - mv_{0x}}{W}y + mv_{0y} \end{cases} \quad \text{[Equation 1]}$$

For example, FIG. 5B illustrates a case in which three CPMVs are used, which may be referred to as a 6-parameter affine model. In this case, a motion vector at an (x, y) sample position may be determined, for example, by Equation 2.

$$\begin{cases} mv_x = \dfrac{mv_{1x} - mv_{0x}}{W}x + \dfrac{mv_{2x} - mv_{0x}}{H}y + mv_{0x} \\ mv_y = \dfrac{mv_{1y} - mv_{0y}}{W}x + \dfrac{mv_{2y} - mv_{0y}}{H}y + mv_{0y} \end{cases} \quad \text{[Equation 2]}$$

In Equations 1 and 2, $\{v_x, v_y\}$ may denote a motion vector at the (x, y) position. In addition, $\{v_{0x}, v_{0y}\}$ may denotes a CPMV of a control point (CP) at a top-left corner position of a coding block, $\{v_{1x}, v_{1y}\}$ may denotes a CPMV of a CP at a top-right corner position, and $\{v_{2x}, v_{2y}\}$ may denotes a CPMV of a CP at a bottom-left corner position. In addition, W may denote a width of a current block, and H may denote a height of the current block.

Figure 6:
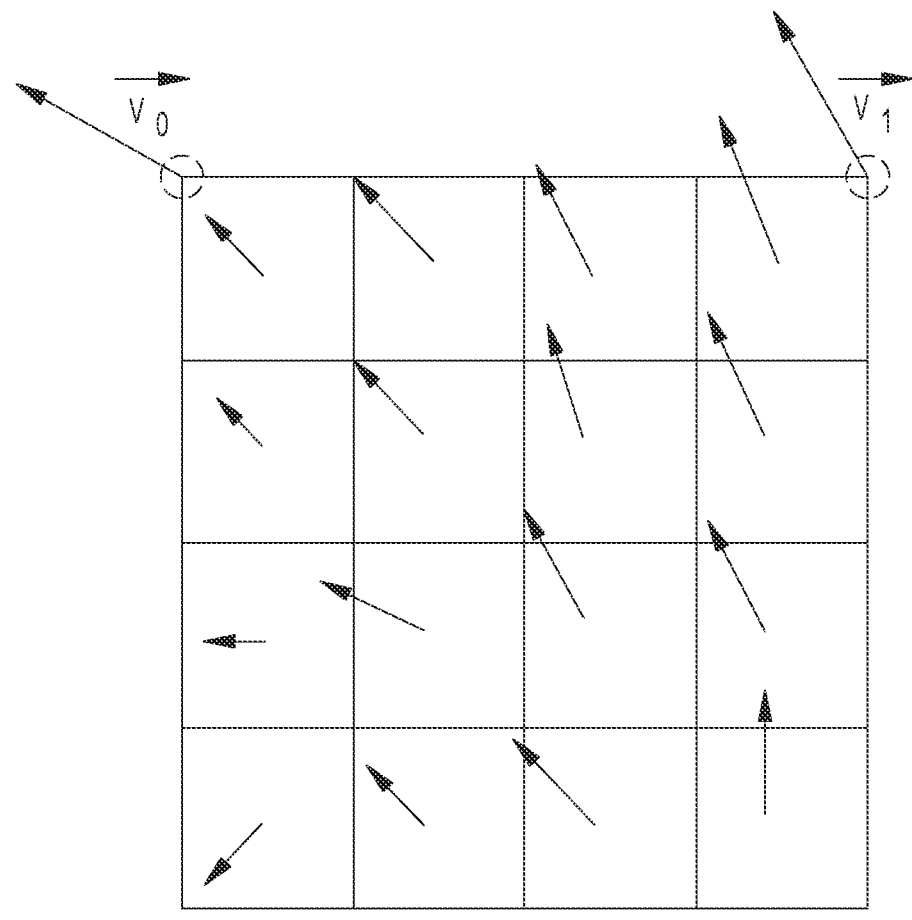
FIG. 6 exemplarily illustrates a case in which an affine motion vector field (MVF) is determined in a subblock unit.

FIG. 6 exemplarily illustrates a case in which an affine MVF is determined in a subblock unit.

In an encoding/decoding process, the affine MVF may be determined in a sample unit or in a subblock unit previously defined. For example, when the affine MVF is determined in a sample unit, a motion vector may be obtained based on each sample value. Alternatively, for example, when the affine MVF is determined in a subblock unit, a motion vector of a corresponding block may be obtained based on a sample value of the center of a subblock (bottom-right of the center, that is, a bottom-right sample among four samples at the center). That is, in affine motion prediction, a motion vector of a current block may be derived in a sample unit or a subblock unit.

In the case of FIG. 6, the affine MVF may be determined in a 4×4 subblock unit, but a size of the subblock may be variously modified.

That is, when affine prediction is available, a motion model applicable to a current block may include three models (a translational motion model, a 4-parameter affine motion model, and a 6-parameter affine motion model). Here, the translational motion model may represent a model in which an existing block unit motion vector is used. The 4-parameter affine motion model may represent a model in which two CPMVs are used. The 6-parameter affine motion model may represent a model in which three CPMVs are used.

Meanwhile, the affine motion prediction may include an affine MVP (or affine inter) mode or an affine merge mode.

Figure 7:
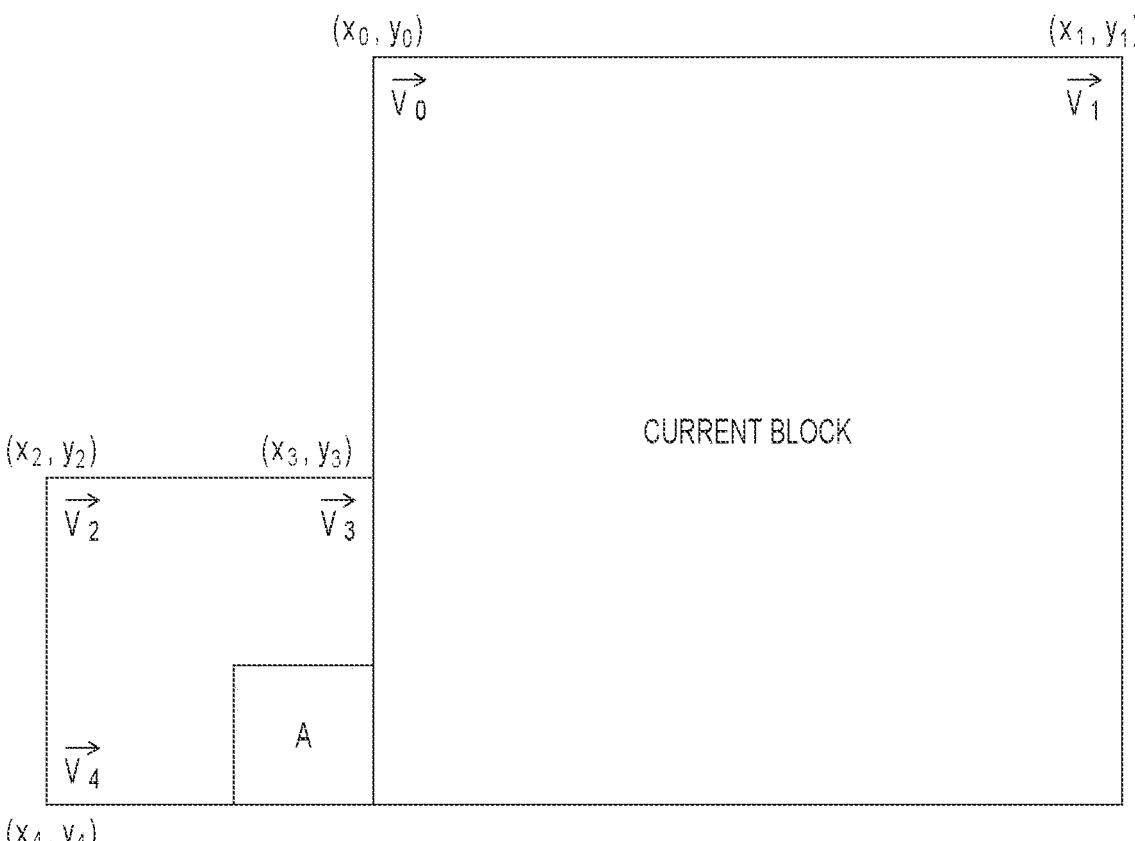
FIG. 7 is a diagram illustrating an affine merge mode in inter prediction.

FIG. 7 is a diagram illustrating an affine merge mode in inter prediction.

For example, in the affine merge mode, a CPMV may be determined according to an affine motion model of a neighboring block coded through affine motion prediction. For example, neighboring blocks coded through the affine motion prediction in search order may be used for the affine merge mode. That is, when at least one of the neighboring blocks is coded through the affine motion prediction, a current block may be coded in the affine merge mode. Here, the affine merge mode may be referred to as AF_MERGE.

When the affine merge mode is applied, CPMVs of a current block may be derived using CPMVs of neighboring blocks. In this case, the CPMVs of the neighboring blocks may be used as the CPMVs of the current block without any change, and the CPMVs of the neighboring blocks may be modified based on sizes of the neighboring blocks, a size of the current block, or the like and may be used as the CPMVs of the current block.

Meanwhile, an affine merge mode, in which a motion vector (MV) is derived in a subblock unit, may be referred to as a subblock merge mode, which may be indicated based on a subblock merge flag (or a merge_subblock_flag syntax element). Alternatively, when a value of the merge_subblock_flag syntax element is 1, it may indicate that the subblock merge mode is applied. In this case, an affine merge candidate list to be described below may also be referred to as a subblock merge candidate list. In this case, the subblock merge candidate list may further include a candidate derived as an SbTMVP to be described below: In this case, the candidate derived as the SbTMVP may be used as a candidate of index 0 in the subblock merge candidate list. In other words, the candidate derived as the SbTMVP may be located ahead of an inherited affine candidate or a constructed affine candidate described below, in the sub-block merge candidate list.

When the affine merge mode is applied, an affine merge candidate list may be constructed to derive CPMVs of a current block. For example, the affine merge candidate list may include at least one candidate among 1) an inherited affine merge candidate, 2) a constructed affine merge candidate, and 3) a zero motion vector candidate (or zero vector). Here, when neighboring blocks are coded in an affine mode, the inherited affine merge candidate may be a candidate derived based on CPMVs of the neighboring blocks. The constructed affine merge candidate may be a candidate derived by constructing CPMVs in a unit of each CPMV based on an MV of a neighboring block of a corresponding CP, and the zero motion vector candidate may represent a candidate consisting of CPMVs of which values are 0.

The affine merge candidate list may be constructed, for example, as follows.

There may be up to two inherited affine candidates, and inherited affine candidates may be derived from affine motion models of neighboring blocks. The neighboring blocks may include one left neighboring block and a top neighboring block. Candidate blocks may be located as shown in FIG. 4. A scan order for a left predictor may be A1→A0, and a scan order for an above predictor may be B1→B0→B2. Only one inherited candidate from each of the left and the above may be selected. A pruning check may not be performed between two inherited candidates.

When a neighboring affine block is checked. CPMVs of the checked block may be used to derive a CPMVP candidate in an affine merge list of a current block. Here, the neighboring affine block may represent a block coded in the affine prediction mode among neighboring blocks of the current block. For example, referring to FIG. 7, when a bottom-left neighboring block A is coded in the affine prediction mode, motion vectors v2, v3, and v4 at a top-left corner, a top-right corner, and a bottom-left corner of the neighboring block A may be obtained. When the neighboring block A is coded as a 4-parameter affine motion model, two CPMVs of the current block may be calculated according to v2 and v3. When the neighboring block A is coded as a 6-parameter affine motion model, three CPMVs of the current block may be calculated according to v2, v3, and v4.

Figure 8:
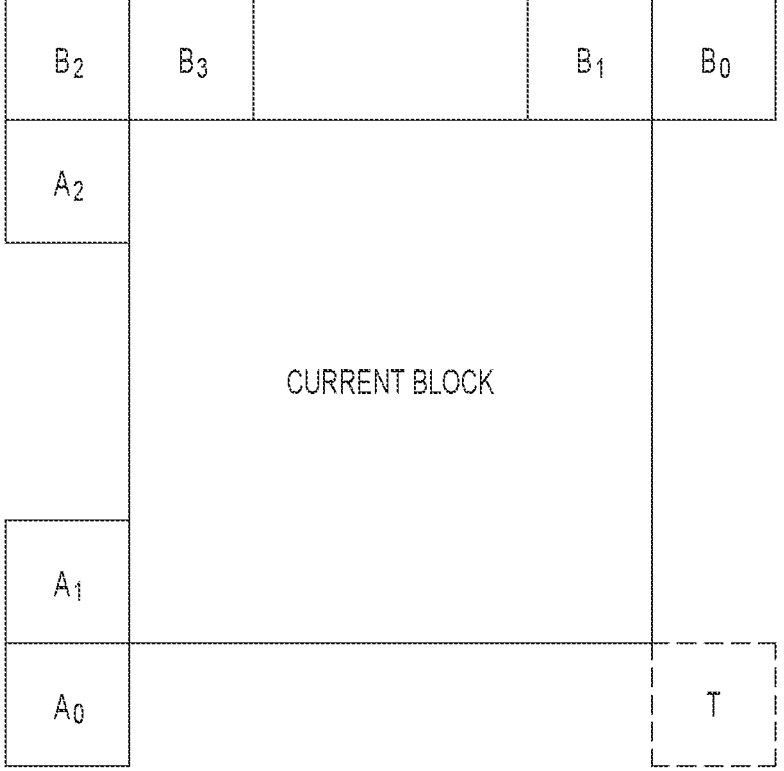
FIG. 8 is a diagram illustrating positions of candidates in an affine merge mode.

FIG. 8 is a diagram illustrating positions of candidates in an affine merge mode.

A constructed affine candidate may refer to a candidate constructed by combining translational motion information around each control point. Motion information of the control points may be derived from specified spatial and temporal neighbors. CPMVk (k=0, 1, 2, or 3) may denote a $k^{th}$ control point.

Referring to FIG. 8, for CPMV0, blocks may be checked in the order of B2→B3→A2, and a motion vector of a block that is first available may be used. For CPMV1, blocks may be checked according to the order of B1→B0, and for CPMV2, blocks may be checked according to the order of A1→A0. A temporal motion vector predictor (TVMP) may be used as CPMV3 when it is available.

After motion vectors of four control points are obtained, affine merge candidates may be generated based on obtained motion information. A combination of CPMVs may correspond to any one of {CPMV0, CPMV1, CPMV2}, {CPMV0, CPMV1, CPMV3}, {CPMV0, CPMV2, CPMV3}, {CPMV1, CPMV2, CPMV3}, {CPMV0, CPMV1}, and {CPMV0, CPMV2}.

A combination of three CPMVs may constitute a 6-parameter affine merge candidate, and a combination of two CPMVs may constitute a 4-parameter affine merge candidate. In order to avoid a motion scaling process, when reference indices of control points are different, related combinations of CPMVs may be discarded.

Hereinafter, IBC, which may be performed in the predictor of the apparatus of FIG. 2 or 3, will be described in detail. The IBC may be used for content image/video coding of a game or the like, for example, SCC. The IBC basically performs prediction in a current picture but may be performed similarly to inter prediction in that a reference block is derived in the current picture. That is, the IBC may use at least one of inter prediction techniques described in the present disclosure. For example, the IBC may use at least one of the above-described methods of deriving motion information (motion vector). The IBC may refer to a current picture, and thus the IBC may be referred to as a current picture referencing (CPR). When the above-described prediction methods are applied to the IBC, a motion vector (motion information) may be generally referred to (replaced or used interchangeably therewith) as a block vector (block information).

For the IBC, the encoding apparatus may perform block matching (BM) and may derive an optimal block vector (or a motion vector) for a current block (for example, a CU). The derived block vector (or the motion vector) may be signaled to the decoding apparatus through a bitstream using a method that is similar to block information (motion vector) signaling in inter prediction described above. The decoding apparatus may derive a reference block for the current block in a current picture through the signaled block vector (motion vector), thereby driving a prediction signal (predicted block or predicted samples) for the current block. Here, the block vector (or the motion vector) may indicate a displacement from the current block to the reference block located in an area already reconstructed in the current picture. Thus, the block vector (or the motion vector) may also be referred to as a displacement vector. Hereinafter, in the IBC, the motion vector may correspond to the block vector or the displacement vector. The motion vector of the current block may include a motion vector for a luma component (luma motion vector) or a motion vector for a chroma component (chroma motion vector). For example, the luma motion vector for an IBC-coded CU may be an integer sample unit (that is, integer precision). The chroma motion vector may also be clipped in an integer sample unit. As described above, the IBC may use at least one of inter prediction techniques, and for example, when the IBC is applied like AMVR, 1-pel and 4-pel motion vector precision may be switched.

In order to reduce memory consumption and decoder complexity, only a reconstructed portion of a predetermined area including a current CTU may be used. Such a restriction allows an IBC mode to be implemented using a local on-chip memory for hardware implementation.

In the encoder, hash-based motion estimation is performed for IBC. The encoder performs RD check on blocks of which a width or height is not greater than that of 16 luma samples. In the case of a non-merge mode, a search for a block vector is performed using a hash-based search first. When a hash search does not return a valid candidate, a BM-based local search is performed.

In the hash-based search, hash key matching (32-bit cycle redundancy check (CRC)) between a current block and a reference block is extended to all allowed block sizes. A hash key calculation for all positions in a current picture is based on 4×4 subblocks. For a current block with a larger size, a hash key is determined to match that of the reference block when all hash keys of all the 4×4 subblocks match a hash key at a corresponding reference position. When hash keys of a plurality of reference blocks are found to match that of the current block, the block vector costs of each matched reference are calculated, and a block vector cost of the minimum cost is selected.

In a block matching search, a search range is set to be N samples at the left and top of a current block in a current CTU. At the beginning of a CTU, a value of N is initialized to 128 when there is no temporal reference picture and is initialized to 64 when there is at least one temporal reference picture. A hash hit ratio is defined as the percentage of samples in which a match is found using a hash-based search in a CTU. While the current CTU is encoded, when the hash hit ratio is less than 5%, N is reduced by half.

At a CU level, an IBC mode may be signaled together with flag information (for example, flag information indicating whether the IBC is applied, pred_mode_ibc_flag) and may be signaled as an IBC AMVP mode or an IBC skip/ merge mode as follows.

IBC skip/merge mode (or IBC merge mode): a merge candidate index is used to indicate which block vector of a list from a neighboring candidate IBC-coded block is used to predict a current block. A merge candidate list consists of spatial, HMVP, and/or pairwise candidates.

IBC AMVP mode: a block vector difference is coded in the same manner as an MVD. A block vector prediction method uses two candidates as predictors, wherein one is from a left neighbor, and the other is from an above neighbor (when IBC-coded). When neighbors are not available, a default block vector will be used as a predictor. A flag indicating a block vector predictor index is signaled.

Figure 9:
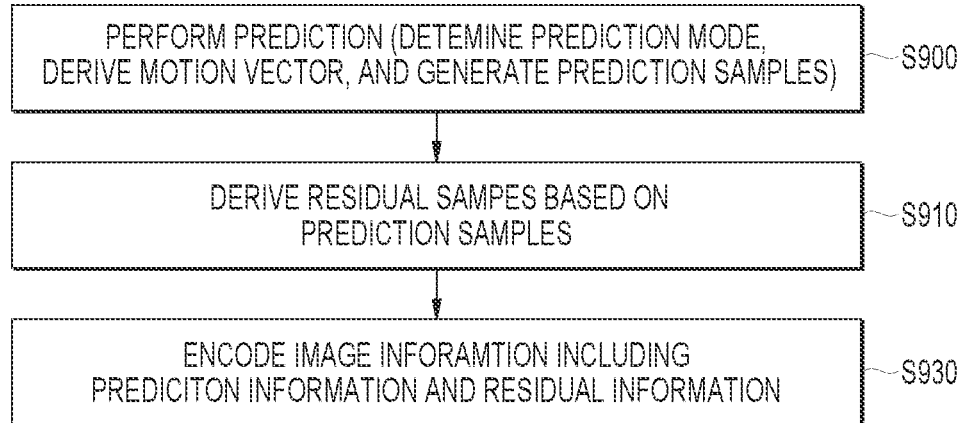
FIGS. 9 and 10 illustrate an image decoding method based on an inter block copy (IBC) prediction mode and a predictor of a decoding apparatus that performs the same.
Figure 10:
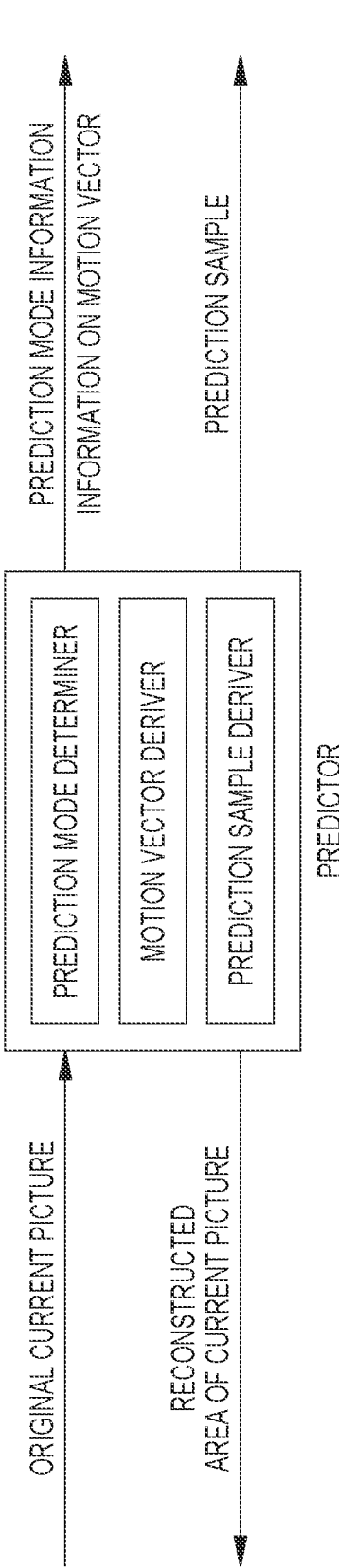

FIGS. 9 and 10 illustrate an image decoding method based on an IBC prediction mode and a predictor of a decoding apparatus that performs the same.

The encoding apparatus performs IBC prediction (IBC-based prediction) on a current block. The encoding apparatus may derive a prediction mode and a motion vector of the current block and may generate prediction samples of the current block. The prediction mode may include at least one of inter prediction modes described above as prediction modes for IBC. Here, prediction mode determination, motion vector derivation, and prediction samples generation procedures may be performed simultaneously, or any one procedure may be performed before other procedures. For example, a predictor of the encoding apparatus may include a prediction mode determiner, a motion vector deriver, and a prediction sample deriver. The prediction mode determiner may determine a prediction mode for the current block, the motion vector deriver may derive a motion vector of the current block, and the prediction sample deriver may derive prediction samples of the current block. For example, the predictor of the encoding apparatus may search for a block similar to the current block in a reconstructed area (or a certain area (search area) of the reconstructed area) of the current picture through BM and may derive a reference block of which a difference from the current block is a minimum or a certain criterion or less. The predictor may derive a motion vector based on a displacement difference between the reference block and the current block. The encoding apparatus may determine a mode applied to the current block among various prediction modes. The encoding apparatus may compare RD costs based on the various prediction modes and may determine an optimal prediction mode for the current block.

For example, when a skip mode or a merge mode is applied to the current block, the encoding apparatus may construct the above-described merge candidate list and may derive a reference block of which a difference from the current block is minimum or a certain criterion or less among reference blocks indicated by merge candidates included in the merge candidate list. In this case, a merge candidate associated with the derived reference block may be selected, and merge index information indicating the selected merge candidate may be generated and signaled to a decoding apparatus. A motion vector of the current block may be derived using a motion vector of the selected merge candidate.

As another example, when a (A) MVP mode is applied to the current block, the encoding apparatus may construct a (A) MVP candidate list described above and may use a motion vector of an mvp candidate, which is selected from among mvp candidates included in the (A) MVP candidate list, as an mvp of the current block. In this case, for example, a motion vector indicating the reference block derived by motion estimation described above may be used as the motion vector of the current block, and among the mvp candidates, an mvp candidate having a motion vector, of which a difference from the motion vector of the current block, is smallest, may be the selected mvp candidate. An MVD, which is a difference in which the mvp is subtracted from the motion vector of the current block, may be derived. In this case, information on the MVD may be signaled to the decoding apparatus.

The encoding apparatus may derive residual samples based on the prediction samples. The encoding apparatus may derive the residual samples through comparison between original samples of the current block and the prediction samples.

The encoding apparatus encodes image information including prediction information and residual information. The encoding apparatus may output encoded image information in the form of a bitstream. The prediction information may include prediction mode information (for example, a skip flag, a merge flag, or a mode index) and information on a motion vector as information related to such a prediction procedure. The information on the motion vector may include candidate selection information (for example, a merge index, an MVP flag, or an MVP index), which is information for deriving a motion vector. In addition, the information on the motion vector may include the above-described information on the MVD. In addition, the information on the motion vector may include information indicating whether L0 prediction, L1 prediction, or Bi prediction is applied. The residual information is information on the residual samples. The residual information may include information on quantized transform coefficients for the residual samples.

The output bitstream may be stored in a (digital) storage medium and transmitted to the decoding apparatus or may be transmitted to the decoding apparatus via a network.

Meanwhile, as described above, the encoding apparatus may generate a reconstructed picture (including reconstructed samples and a reconstructed block) based on the reference samples and the residual samples. This is because the encoding apparatus is to derive the same prediction result as that performed in the decoding apparatus, and through this coding efficiency may be increased. Therefore, the encoding apparatus may store the reconstructed area (the reconstructed samples or the reconstructed block) of the current picture in a memory and may use the reconstructed area as a reference picture for IBC prediction.

Figure 11:
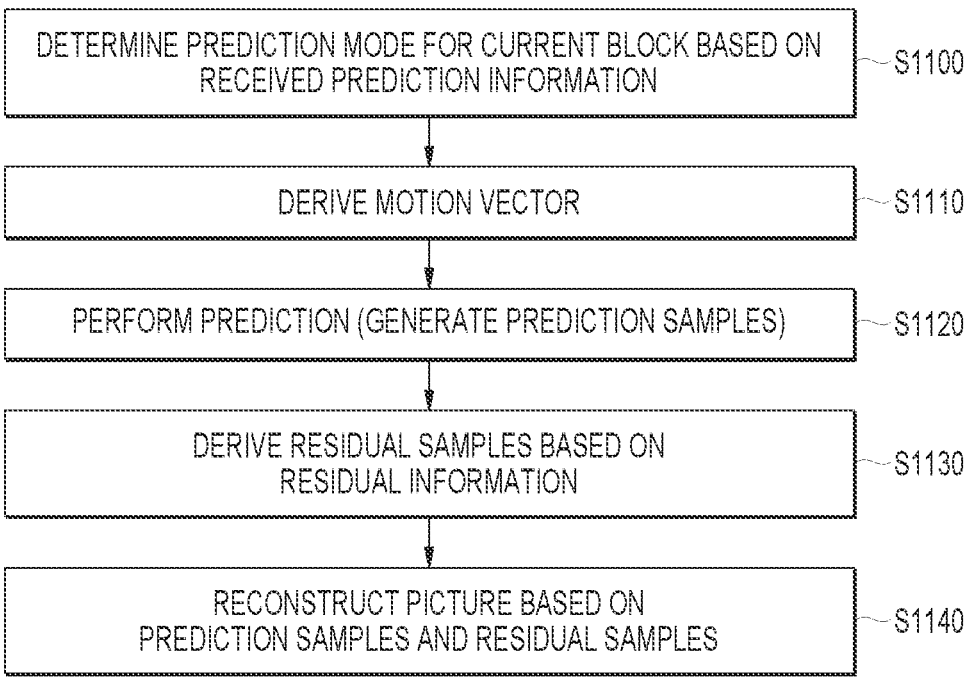
FIGS. 11 and 12 illustrate an image encoding method based on an IBC prediction mode and a predictor of a decoding apparatus that performs the same.
Figure 12:
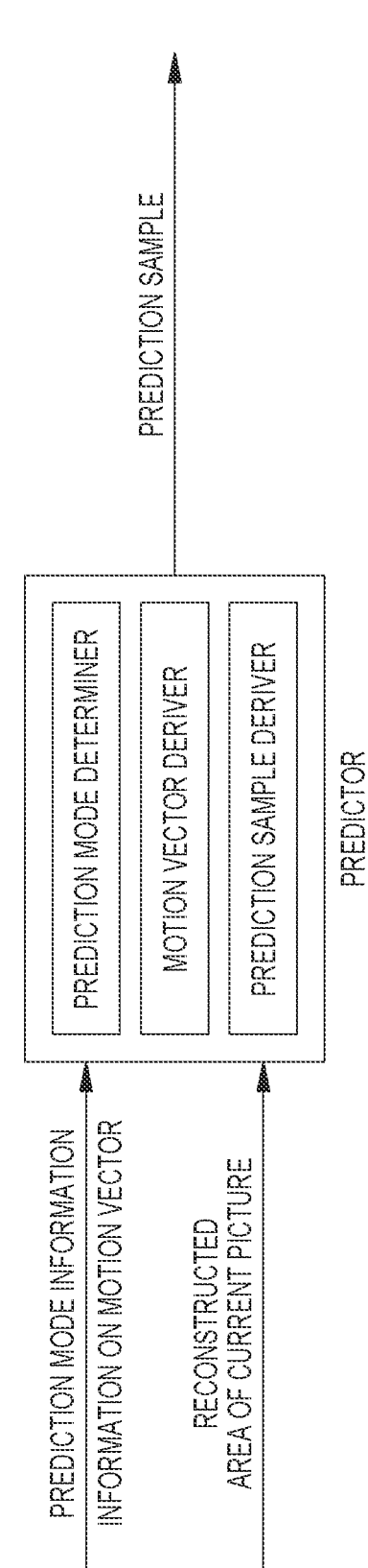

FIGS. 11 and 12 illustrate an image encoding method based on an IBC prediction mode and a predictor of a decoding apparatus that performs the same.

The decoding apparatus may perform an operation corresponding to an operation performed by the encoding apparatus. The decoding apparatus may perform IBC prediction on a current block based on received prediction information and may derive prediction samples.

Specifically, the decoding apparatus may determine a prediction mode for the current block based on the received prediction information. The decoding apparatus may determine which inter prediction mode is to be applied to the current block based on prediction mode information in the prediction information.

For example, based on such a merge flag, the decoding apparatus may determine whether such a merge mode is applied to the current block or a (A) MVP mode is determined. Alternatively, one of various prediction mode candidates may be selected based on such a mode index. The prediction mode candidates may include a skip mode, a merge mode, and/or a (A) MVP mode or may include various inter prediction modes described with reference to FIG. 4.

The decoding apparatus derives a motion vector of the current block based on the determined prediction mode. For example, when the skip mode or the merge mode is applied to the current block, the decoding apparatus may construct a merge candidate list as described above and may select one merge candidate of merge candidates included in the merge candidate list. The selection may be performed based on selection information (merge index) as described above. The motion vector of the current block may be derived using a motion vector of the selected merge candidate. The motion vector of the selected merge candidate may be used as the motion vector of the current block.

As another example, when the (A) MVP mode is applied to the current block, the decoding apparatus may construct a (A) MVP candidate list described above and may use a motion vector of an mvp candidate, which is selected from among mvp candidates included in the (A) MVP candidate list, as an mvp of the current block. The selection may be performed based on selection information (mvp flag or mvp index) described above. In this case, an MVD of the current block may be derived based on information on an MVD described above, and the motion vector of the current block may be derived based on the mvp and the MVD of the current block.

Meanwhile, as described above, motion information of the current block may be derived without the construction of a candidate list. In this case, the motion vector of the current block may be derived according to a procedure initiated in a corresponding prediction mode. In this case, the construction of the candidate list as described above may be omitted.

The decoding apparatus may generate prediction samples of the current block based on the motion vector of the current block. The prediction samples of the current block may be derived using samples of a reference block indicated by the motion vector of the current block on such a current picture. In this case, a prediction sample filtering procedure may be further performed on all or some of the prediction samples of the current block.

For example, a predictor of the decoding apparatus may include a prediction mode determiner, a motion vector deriver, and a prediction sample deriver. The prediction mode determiner may determine the prediction mode for the current block based on a received prediction mode vector, the motion vector deriver may derive the motion vector of the current block based on received information on a motion vector, and the prediction sample deriver may derive the prediction samples of the current block.

The decoding apparatus generates residual samples for the current block based on received residual information. The decoding apparatus may generate reconstructed samples for the current block based on the prediction samples and the residual samples and may generate a reconstructed picture based thereon. Thereafter, an in-loop filtering procedure or the like may be further applied to the reconstructed picture as described above.

Meanwhile, as described above, IBC may be a prediction mode of searching for a block similar to a current block in a specific area in a current picture to derive a reference block and signaling position information on the reference block and may have an effect of finding duplicate images in neighboring areas and thus may be used for video/video coding of content such as games together with SCC.

However, there may be a case in which a neighboring area and a current block are similar, but the IBC may not be applied due to the deformation of one or the other. For the above-described case, the present disclosure proposes an embodiment in which, by reflecting a difference in deformation between a neighboring block and a current block, the neighboring block is allowed to match the current block. For example, when the IBC is used, in order to reflect the transformation of an intra prediction block, affine prediction and/or scaling techniques are applied to derive a reference block, thereby increasing the accuracy of a prediction block and compression efficiency.

In one embodiment, the present disclosure proposes a method of applying affine prediction for a current block for which an IBC mode is selected. For example, the present disclosure proposes an embodiment in which the above-described affine prediction is applied to an IBC mode to reflect a difference in deformation between an adjacent block and a current block.

Figure 13:
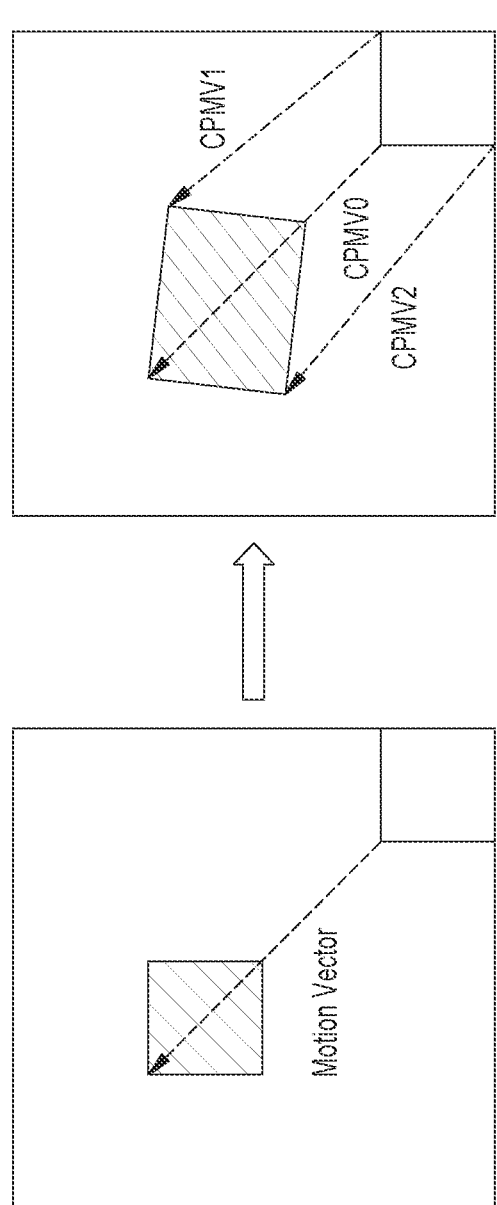
FIG. 13 illustrates an example in which a reference block is derived by applying affine prediction in IBC prediction.

FIG. 13 illustrates an example in which a reference block is derived by applying affine prediction in IBC prediction. Referring to FIG. 13, the reference block in a current picture may be derived based on CPMVs according to affine prediction of the current block.

When the affine prediction is applied, a 4-parameter affine model or a 6-parameter affine model may be determined according to an affine type. When the 4-parameter affine model (4-param) is applied to the current block, deformation of scaling, rotation, and/or the like may be reflected using CPMV0 and CPMV1. In addition, when the 6-parameter affine model (6-param) is applied to the current block, scaling and rotation as well as a ratio change and shear deformation may be reflected using CPMV0, CPMV1, and CPMV2. FIG. 13 illustrates an example of deformation using three CPMVs when the 6-parameter affine model is applied. Meanwhile, position information in an IBC mode may be defined as a block vector (BV), and in the present embodiment, the BV may be used interchangeably with a motion vector (MV). In addition, in the present embodiment, a control point block vector (CPBV) may be defined as a block vector at a control point and may be used interchangeably with a CPMV.

Figure 14:
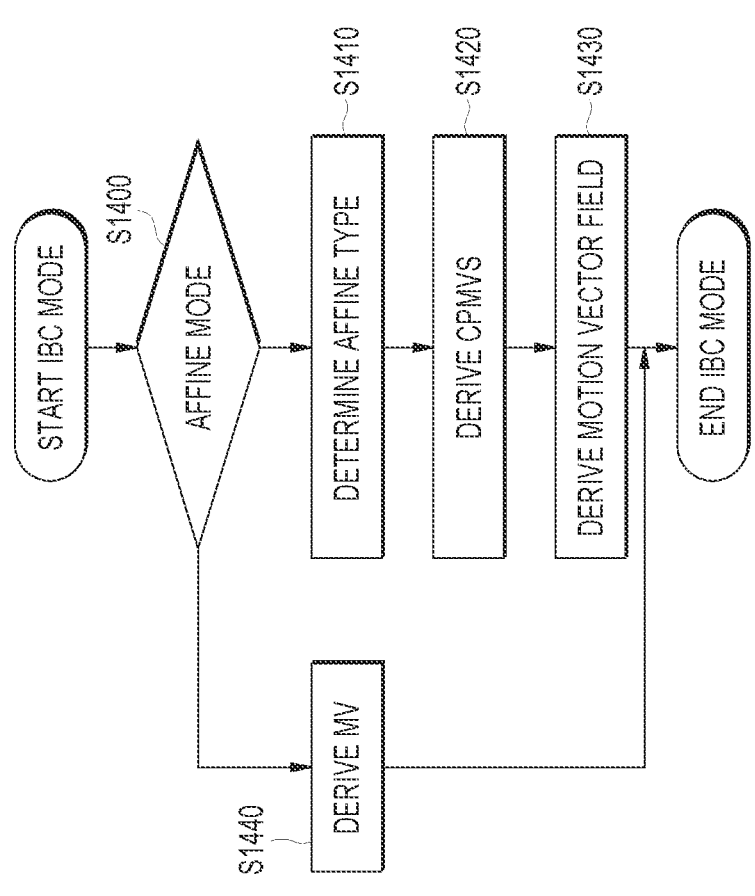
FIG. 14 schematically illustrates a method of applying an IBC mode according to the present embodiment.

FIG. 14 schematically illustrates a method of applying an IBC mode according to the present embodiment. Referring to FIG. 14, it may be determined whether an affine mode is applied to a current block to which an IBC mode is applied (S1400), and when the affine mode is applied, an affine type for the current block may be determined (S1410). For example, the affine model of the current block may be determined as a 4-parameter affine model or a 6-parameter affine model based on affine type information of the current block. Afterwards, CPMVs of the current block may be derived (S1420), an MVF may be derived based on the CPMVs (S1430), and prediction samples of the current block may be derived based on the MVF. Meanwhile, when the affine mode is not applied, a motion vector of the current block may be derived (S1440), and the prediction samples of the current block may be derived based on the motion vector.

In the IBC mode, a prediction block may be found through unidirectional prediction using the current picture as one reference picture, and thus unidirectional CPMV0 and CPMV1 information or CPMV0, CPMV1, and CPMV2 information may be signaled. In addition, for example, when multiple block vectors for the IBC mode are allowed, affine prediction for the IBC mode may also be expanded to have CPMVs in multiple directions. In addition, for example, for MVP information, a separate MVP list for IBC affine, which is separate from the IBC mode, may be constructed, and an index for the MVP list may be signaled.

Meanwhile, a syntax of an existing IBC mode may be expressed as in the following table.

TABLE 1

```
if( general merge flag[ x0 ][ y0 ] )
    merge data( x0, y0, cbWidth, cbHeight, chType )
else if( CuPredMode[ chType ][ x0 ][ y0 ] = = MODE IBC
) {
    mvd coding( x0, y0, 0, 0 )
    if( MaxNumIbcMergeCand > 1 )
        mvp_l0_flag[ x0 ][ y0 ]                    ae(v)
    if( sps_amvr_enabled_flag &&
        ( MydL0[ x0 ][ y0 ][ 0 ] != 0 || MvdL0[ x0 ][ y0 ][ 1 ]
        != 0 ) )
        amvr_precision_idx[ x0 ][ y0 ]             ae(v)
} else {
```

TABLE 1-continued

```
/* inter mode */
}
```

Referring to Table 1, when an IBC mode is selected as a prediction mode of a current block, MVP information and MVD information may be signaled, and adaptive motion vector resolution (AMVR) may be applied. A syntax element mvp_l0_flag[x0][y0] may indicate MVP of the current block, and a syntax element amvr_precision_idx[x0][y0] may indicate resolution of an MVD of the current block.

Here, the AMVR may represent a method of adaptively coding the precision or resolution of an MVD of a CU. For example, resolution of an MVD of a current block in which a general AMVP mode is applied is adaptively selected as a quarter luma sample, an integer luma sample, or a four-luma sample. Alternatively, for example, the resolution of the MVD of the current block to which the affine AMVP mode is applied is adaptively selected with a quarter luma sample, an integer luma sample, or a 1/16 luma sample. In addition, for example, AMVR for an IBC mode may be applied, and different resolutions may be allowed for an IBC mode and an IBC affine mode.

In addition, a syntax of an IBC mode according to the above-described embodiment proposed in the present disclosure may be expressed as in the following table.

TABLE 2

```
if( general merge flag[ x0 ][ y0 ] )
    merge data( x0, y0, cbWidth, cbHeight, chType )
else if( CuPredMode[ chType ][ x0 ][ y0 ] = = MODE IBC ) {
    mvd coding( x0, y0, 0, 0 )
    if( sps affine enabled flag && cbWidth >= 16 && cbHeight >= 16 ) {
        inter_affine_flag[ x0 ][ y0 ]                                             ae(v)
        if( sps 6param affine enabled flag && inter affine flag[ x0 ][ y0 ] )
            cu_affine_type_flag[ x0 ][ y0 ]                                       ae(v)
    }
    if( MotionModelIdc[ x0 ][ y0 ] > 0 )
        mvd coding( x0, y0, 0, 1 )
    if(MotionModelIdc[ x0 ][ y0 ] > 1 )
        mvd coding( x0, y0, 0, 2 )
    if( MaxNumIbcMergeCand > 1.)
        mvp_l0_flag[ x0 ][ y0 ]                                                   ae(v)
    if( sps_amvr_enabled_flag &&
        ( MvdL0[ x0 ][ y0 ][ 0 ] != 0 || MvdL0[ x0 ][ y0 ][ 1 ] != 0 ) ||
        ( sps_affine_amvr_enabled_flag && inter_affine_flag[ x0 ][ y0 ] = = 1 &&
        ( MvdCpL0[ x0 ][ y0 ][ 0 ][ 0 ] != 0 || MvdCpL0[ x0 ][ y0 ][ 0 ][ 1 ] != 0 ||
        MvdCpL0[ x0 ][ y0 ][ 1 ][ 0 ] != 0 || MvdCpL0[ x0 ][ y0 ][ 1 ][ 1 ] != 0 ||
        MvdCpL0[ x0 ][ y0 ][ 2 ][ 0 ] != 0 || MvdCpL0[ x0 ][ y0 ][ 2 ][ 1 ] != 0 ) ) {
        amvr_precision_idx[ x0 ][ y0 ]                                           ae(v)
    } else {
/* inter mode */
}
```

Referring to Table 2, for example, when an IBC mode is applied to a current block, affine prediction is available, and when the current block satisfies a block size condition, an affine flag may be signaled. In this case, the block size condition disclosed in Table 2 is merely an example and may not be applied or may be modified. For example, referring to Table 2, when the affine prediction is available and a width and height of the current block are each 16 or more, the affine flag may be signaled. inter_affine_flag[x0][y0] may represent a syntax element of the affine flag.

In addition, referring to Table 2, when an affine model such as 4-param/6-param may be changed, an affine type flag indicating an affine model type of the current block may be signaled. Furthermore, when the affine type flag is not signaled, a determined affine model may be applied to the current block. Cu_affine_type_flag[x0][y0] may represent a syntax element of the affine type flag.

In addition, for example, referring to Table 2, when the affine type flag indicates a 4-parameter affine model, an MVD of CPMV1 may be additionally signaled, and when the affine type flag indicates a 6-parameter affine model, MVDs of CPMV1 and CPMV2 may be additionally signaled.

Furthermore, for example, an MVP list for an affine mode may be constructed. In addition, for example, an MVP list for an IBC affine inter mode and an MVP list for an IBC affine merge mode may be used separately.

In addition, for example, AMVR for an IBC mode may be applied, and different resolutions may be allowed for an IBC mode and an IBC affine mode.

In another embodiment, a proposed method is a method of applying affine prediction for a current block for which an IBC mode is selected, wherein only rotation deformation at a specific angle is allowed. For example, a proposed embodiment is an embodiment in which affine prediction, which only reflects rotation deformation of a neighboring block and a current block, is applied to an IBC mode.

For example, a syntax of an IBC mode according to the present embodiment may be expressed as in the following table.

TABLE 3

```
if( general merge flag[ x0 ][ y0 ] )
    merge data( x0, y0, cbWidth, cbHeight, chType )
else if( CuPredMode[ chType ][ x0 ][ y0 ] = = MODE IBC
) {
    mvd coding( x0, y0, 0, 0 )
    if( sps affine enabled flag && cbWidth >= 16 &&
    cbHeight >= 16 ) {
        inter__affine__flag[ x0 ][ y0 ]                    ae(v)
    if( inter affine flag[ x0 ][ y0 ] )
        affine_angle_idc[ x0 ][ y0 ]                       ae(v)
}
        if( MaxNumIbcMergeCand > 1 )
            mvp l0 flag[ x0 ][ y0 ]                        ae(v)
        if( sps__amvr__enabled__flag &&
            ( MvdL0[ x0 ][ y0 ][ 0 ] != 0 || MvdL0[ x0 ][ y0 ][
            1 ] != 0 ) ) {
            amvr_precision__idx[ x0 ][ y0 ]                ae(v)
    } else {
/* inter mode */
}
```

In the present embodiment, since only rotation deformation is allowed, an additional CPMV may not be necessary. Therefore, referring to Table 3, when affine prediction for an IBC mode is available and necessary, a flag indicating whether rotation is allowed may be signaled when conditions such as a block size are satisfied, and when the flag is true, an affine angle index indicating a predetermined deformation angle may be signaled. In other words, for example, when the affine prediction is available and a current block satisfies a block size condition, an affine flag may be signaled, and when a value of the affine flag is 1, an affine angle index for the current block may be signaled. A syntax element of the affine angle index may be affine_angle_idc.

For example, an affine angle index indicating a deformation angle may be defined as follows.

For example, the affine angle index may indicate an arbitrary angle, and a value range thereof may have a predetermined value. As an example, the affine angle index may have a value of 0 to 1 or may have a value of 0 to 3.

Alternatively, for example, when the value of the affine angle index is 0, the affine angle index may represent 45 degrees clockwise, and when the value of the affine angle index is 1, the affine angle index may represent 45 degrees counterclockwise. Alternatively, for example, when the value of the affine angle index is 0, the affine angle index may represent 45 degrees counterclockwise, and when the value of the affine angle index is 1, the affine angle index may represent 45 degrees clockwise. Meanwhile, the angle may be defined as an angle other than 45 degrees.

Alternatively, for example, when the value of the affine angle index is 0, the affine angle index may represent 45 degrees clockwise, when the value of the affine angle index is 1, the affine angle index may represent 90 degrees clockwise, when the value of the affine angle index is 2, the affine angle index may represent 45 degrees counterclockwise, and when the value of the affine angle index is 3, the affine angle index may represent 90 degrees counterclockwise. Meanwhile, the order of angles defined by the value of the affine angle index may be modified.

In the present embodiment, a center position of a block may be considered as a reference point for rotation deformation. That is, a motion vector according to a rotation angle may be derived based on a center position of a reference block according to an IBC mode. For example, the motion vector may be derived as follows.

$$\begin{bmatrix} \cos\theta & -\sin\theta \\ \sin\theta & \cos\theta \end{bmatrix}\begin{bmatrix} x \\ y \end{bmatrix} \qquad \text{[Equation 3]}$$

Figure 15:
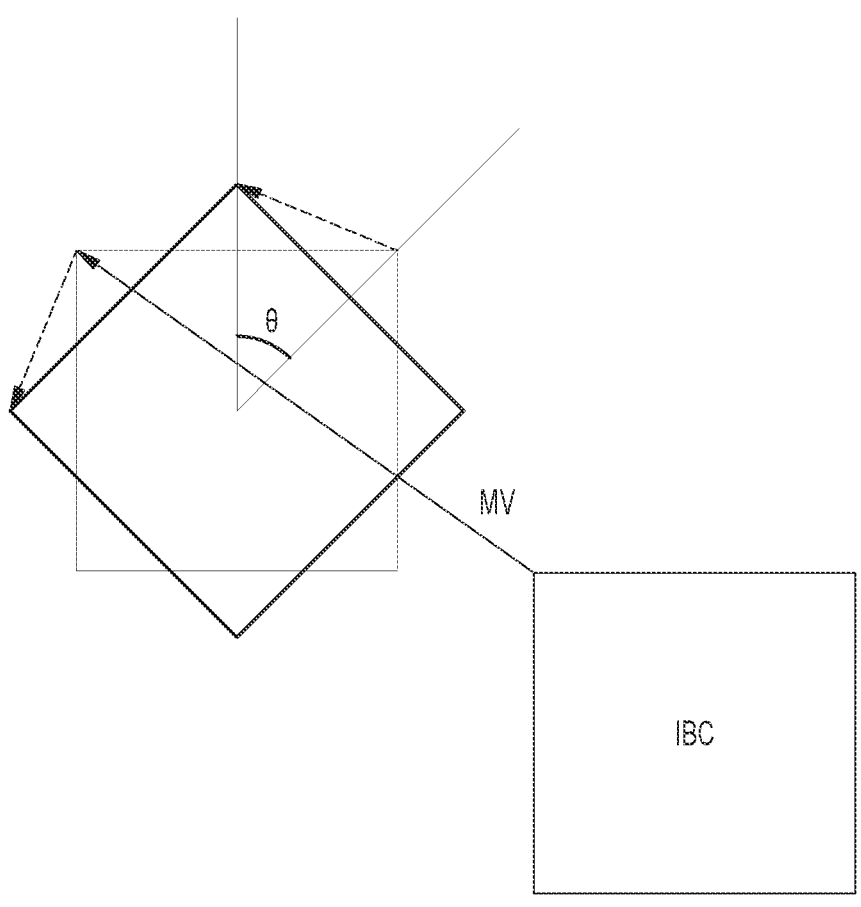
FIG. 15 schematically illustrates a method of deriving a reference block of an IBC mode according to the present embodiment.

FIG. 15 schematically illustrates a method of deriving a reference block of an IBC mode according to the present embodiment.

For example, according to the present embodiment, a reference block in a current picture may be derived based on a block vector of a current block to which an IBC mode is applied, a motion vector according to a rotation angle of a subblock unit of the current block may be derived based on a rotation angle of the current block and a center position of the reference block, a revised reference block may be derived based on the motion vector according to the rotation angle, and a prediction block of the current block may be derived based on the revised reference block. The rotation angle may be derived based on an affine angle index of the current block.

In another embodiment, in deriving a reference block in an IBC mode, a method of deriving a reference sample according to a rotation angle is proposed instead of deriving a motion vector for each subblock unit.

For example, a syntax of an IBC mode according to the present embodiment may be expressed as in the following table.

TABLE 4

```
if( general merge flag[ x0 ][ y0 ] )
    merge data( x0, y0, cbWidth, cbHeight, chType )
else if( CuPredMode[ chType ][ x0 ][ y0 ] = = MODE IBC
) {
    mvd coding( x0, y0, 0, 0 )
    if( sps affine enabled flag && cbWidth >= 16 &&
    cbHeight >= 16 )
affine_angle_idc[ x0 ][ y0 ]                              ae(v)
    if( MaxNumIbcMergeCand > 1 )
        mvp__l0__flag[ x0 ][ y0 ]                         ae(v)
```

TABLE 4-continued

```
        if( sps__amvr_enabled__flag &&
            ( MvdL0[ x0 ][ y0 ][ 0 ] != 0 || MvdL0[ x0 ][ y0 ][
            1 ] != 0 ) ) {
                amvr_precision__idx[ x0 ][ y0 ]                    ae(v)
        } else {
    /* inter mode */
}
```

For example, referring to Table 4, when deformation according to an angle for an IBC mode is available and necessary, a syntax element indicating whether rotation is allowed may be signaled when conditions such as a block size are satisfied. When a value of the syntax element is 0, rotation may not be allowed, and when the value of the syntax element is 1 or 2, the syntax element may indicate a predetermined deformation angle. For example, referring to Table 4, when affine prediction is available and a current block satisfies a block size condition (when a width and height of the current block are each 16 or more), an affine angle index for the current block may be signaled. A syntax element of the affine angle index may be affine_angle_idc.

For example, an affine angle index indicating a deformation angle may be defined as follows.

For example, the affine angle index may represent an arbitrary angle, and a value range thereof may have a predetermined value. As an example, the affine angle index may have a value of 0 to 2 or may have a value of 0 to 4.

Alternatively, for example, when the value of the affine angle index is 0, the affine angle index may indicate that rotation is not applied, when the value of the affine angle index is 1, the affine angle index may indicate 45 degrees clockwise, and when the value of the affine angle index is 2, the affine angle index may indicate 45 degrees counterclockwise. Alternatively, for example, when the value of the affine angle index is 0), the affine angle index may indicate that rotation is not applied, when the value of the affine angle index is 1, the affine angle index may indicate 45 degrees counterclockwise, and when the value of the affine angle index is 2, the affine angle index may indicate 45 degrees clockwise. Meanwhile, such an angle may be defined as an angle other than 45 degrees.

Alternatively, for example, when the value of the affine angle index is 0), the affine angle index may indicate that rotation is not applied, when the value of the affine angle index is 1, the affine angle index may represent 45 degrees clockwise, when the value of the affine angle index is 2, the affine angle index may represent 90 degrees clockwise, when the value of the affine angle index is 3, the affine angle index may indicate 45 degrees counterclockwise, and when the value of the affine angle index is 4, the affine angle index may indicate 90 degrees counterclockwise. Meanwhile, the order of angles defined by the value of the affine angle index may be modified.

In the present embodiment, a center position may be considered as a reference point for rotation deformation. That is, a position of a reference sample according to a rotation angle may be derived based on a center position of a reference block according to an IBC mode, and a prediction block may be generated using a reference sample at a rotationally modified position of each sample of a current block.

In another embodiment, a proposed method is a method of applying scaling for a current block for which an IBC mode is selected.

Figure 16:
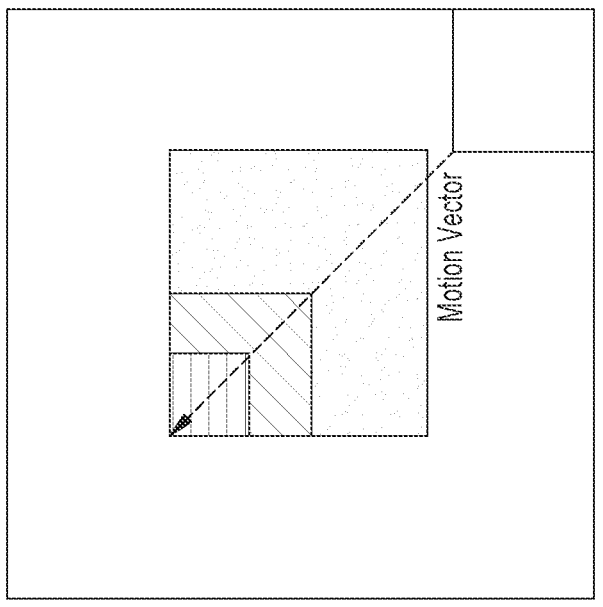
FIG. 16 schematically illustrates a method of deriving a reference block of an IBC mode according to the present embodiment.

FIG. 16 schematically illustrates a method of deriving a reference block of an IBC mode according to the present embodiment. Referring to FIG. 16, in the present embodiment, an example in which a size of a prediction block at a position indicated by a motion vector of a current block is deformed to scale up/down the prediction block for the current block. For example, according to the present embodiment, scale-up or scale-down may be applied to a current block to which an IBC mode is applied, and when the scale-up is selected, a reference block of FIG. 16A (for example, a block with a size W/2×H2) may be selected and scaled up according to a size of the current block. In this case, an interpolation filter may be used to generate a scaled-up prediction block, or without filtering, by using the characteristics of an SCC image, a final prediction block may be generated by filling a space with a redundant sample. Likewise, when the scale-down is selected, a reference block of FIG. 16B (for example, a block with a size 2W×2H) may be selected and may be scaled down according to a size of the current block. In this case, an interpolation filter may be used to generate a scaled-up prediction block, or without filtering, using the characteristics of an SCC image, a final prediction block may be generated by filling a space through sub-sampling.

For example, a syntax of an IBC mode according to the present embodiment may be expressed as in the following table.

TABLE 5

```
    if( general merge flag[ x0 ][ y0 ] )
        merge data( x0, y0, cbWidth, cbHeight, chType )
        else if( CuPredMode[ chType ][ x0 ][ y0 ] = = MODE IBC
        ) }
            mvd coding( x0, y0, 0, 0 )
    if( cbWidth >= 8 && cbHeight >= 8 )
        ibc__scale__idc                                           ae(v)
            if( MaxNumIbcMergeCand > 1 )
                mvp_l0__flag[ x0 ][ y0 ]                          ae(v)
            if( sps__amvr_enabled__flag &&
                ( MvdL0[ x0 ][ y0 ][ 0 ] != 0 || MvdL0[ x0 ][ y0 ][
                1 ] != 0 ) ) {
                    amvr_precision__idx[ x0 ][ y0 ]               ae(v)
            } else {
    /* inter mode */
}
```

For example, referring to Table 5, when deformation according to scaling for an IBC mode is available and a current block satisfies a block size condition, an IBC scale index may be signaled. For example, a syntax element of the IBC scale index may be ibc_scale_idc. For example, referring to Table 5, when a width and height of the current block are each 8 or more, the IBC scale index for the current block may be signaled. In this case, the block size condition disclosed in Table 5 is merely an example and may not be applied or may be modified.

For example, when a value of the IBC scale index is 0, the IBC scale index may indicate that a reference block of the current block is copied, when the value of the IBC scale index is 1, the IBC scale index may indicate that the reference block of the current block is scaled up, and when the value of the IBC scale index is 2, the IBC scale index may indicate that the reference block of the current block is scaled down. For example, when the value of the IBC scale index is 0, the IBC scale index may indicate that scaling is not applied, when the value of the IBC scale index is 1, the IBC scale index may indicate that the reference block of the current block is scaled up, and when the value of the IBC scale index is 2, the IBC scale index may indicate that the reference block of the current block is scaled down. Meanwhile, the meaning according to the value of the IBC scale index may be modified and applied. In addition, when the IBC scale index is not present (that is, the IBC scale index is not signaled), the value of the IBC scale index may be regarded as 0, and scaling may not be applied.

In addition, for example, an MVP list for an IBC scaling mode may be constructed. Here, the IBC scaling mode may represent a method of deriving a revised reference block for applying scaling to a reference block of the above-described IBC mode. In addition, for example, an MVP list for an IBC scaling inter mode and an MVP list for an IBC scaling merge mode may be used separately.

Furthermore, for example, an arbitrary value may be applied as a factor of scale-up/scale-down. For example, in order to prevent an increase in complexity, ×2 may be applied as the factor of the scale-up, and ×½ may be applied as the factor of the scale-down. In this case, when a size of a current block is W×H, a reference block for ×2 may be a reference block with a size W/2×H/2, and a reference block for ×½ may be a block with a size 2W×2H. Alternatively, for example, ×1.5 may be applied as the factor of the scale-up, and ×1/1.5 may be applied as the factor of the scale-down. Alternatively, for example, a combination of specific values may be limited and applied as each of the factor of the scale-up and the factor of the scale-down.

In addition, for example, a padding/sub-sampling method for scale-up/scale-down according to a scale factor may be defined.

Furthermore, for example, scaling information for a current picture or current slice may be signaled in a picture or slice unit. By using the signaled scaling information, a scale of the same scale ratio (for example, ×2) or a scale of the same scale ratio pair may be selectively applied to all coding blocks in a picture or slice.

For example, when available scale pairs are determined in a picture or slice unit, an IBC scale index in a CU unit may indicate ×1, ×2, or ×½ or may indicate ×1, ×1.5, or ×1/1.5. The scale factor determined based on the IBC scale index may be used for scaling a reference block. Through this, ×2 and ×1/1.5 may not be used interchangeably in scaling.

Alternatively, for example, when a scale is determined in a unit of a picture or slice, a flag in the unit of a CU may be signaled, and whether a reference block is copied (for example, whether scaling is not applied), or whether the reference block is scaled according to a specific scale factor may be determined based on the flag.

In addition, for example, when a width and height of a current block are different, a different scale factor may be applied to each of the width and height.

Alternatively, for example, an IBC merge mode may be proposed as follows. For example, a scale factor according to a scale index (scale_idc) of a block neighboring a current block may be inherited and applied to the current block. That is, for example, a scale factor derived based on a scale index of a neighboring block adjacent to a current block may be derived as a scale factor of the current block, and a reference block of the current block may be scaled based on the derived scale factor. In addition, HMVP may be used by storing information of a corresponding block without any change. In addition, in combined MVP such as pairwise, only when values of respective candidates used for combination are the same, deformation is possible such as scaling is applied, or scale information of a specific candidate (for example, a first candidate) is selectively applied, or scaling is not applied in a corresponding case. Furthermore, for example, scaling may not be applied to a zero candidate or a temporal candidate.

In addition, the present disclosure proposes an embodiment in which, when affine prediction is applied for a current block for which an IBC mode is selected, a search range for the IBC mode is deformed.

For example, the search range may be applied differently according to whether affine is applied.

Alternatively, for example, the search range may be applied differently according to an affine model.

Alternatively, for example, a search range of general affine prediction and a search range of affine prediction for an IBC mode may be applied differently. For example, when the search range of the general affine prediction is A×B, the search range of the affine prediction for the IBC mode may be 2A×2B.

Alternatively, for example, the search range may be applied in the same size irrespective of the affine model.

Alternatively, for example, the search range may be applied without limitation.

Alternatively, for example, information on the search range may be signaled with a high-level syntax such as an SPS, a PPS, a picture header (PH), or a slice header (SH). The search range may be derived based on the information on the search range.

Alternatively, for example, the information on the search range may not be separately signaled, and the search range may be derived as a predetermined value between the encoding apparatus and the decoding apparatus. That is, for example, the search range with a preset size may be applied.

In addition, the present disclosure proposes an embodiment in which, when scaling is applied to a current block for which an IBC mode is selected, a search range for the IBC mode is deformed.

For example, the search range may be applied differently according to whether scaling is applied.

Alternatively, for example, the search range may be applied differently according to a scaling ratio.

Alternatively, for example, a search range of a general IBC mode and a search range of an IBC mode to which scaling is applied may be applied differently. For example, when the search range of the general IBC mode is A×B, the search range of the IBC mode to which ×2 scaling is applied may be A/2×B/2, and the search range of the IBC mode to which ×½ scaling is applied may be 2A×2B.

Alternatively, for example, the search range may be applied in the same size irrespective of the scaling ratio.

Alternatively, for example, the search range may be applied differentially to the general IBC mode and an IBC scaling mode. For example, the search ranges of the IBC scaling mode and the search range of the general IBC mode may be applied differently, but the same search range may be applied irrespective of the scaling ratio.

Alternatively, for example, information on the search range may be signaled with a high-level syntax such as an SPS, a PPS, a PH, or a SH. The search range may be derived based on the information on the search range.

In addition, in one embodiment, there may be proposed a method in which a scaling method for an IBC mode proposed in the present disclosure is extended and applied to a general inter prediction mode/merge mode. For example, a method of applying scale-up/scale-down by differing a size of a reference block indicated by motion information of a current block in a general inter prediction mode/merge mode may be proposed. In addition, when scale-up/scale-down is applied to an SCC image, without filtering, padding and/or sub-sampling may be performed and a scaled-up/scaled-down final predictor may be generated. However, when scale-up/scale-down is applied to a general natural image, scaling may be performed by applying an upsampling filter and a downsampling filter for each mode.

For example, scale-up/scale-down may be determined in a unit of each CU or for each direction in the CU, and an applicable scale factor may be determined in a unit of a picture/slice. That is, for example, a scale factor for a specific reference picture may be determined as ×2 or ×½, and a scale factor for another reference picture may be determined as ×1.5 or ×1/1.5. For example, when a different scale is applied for each picture, the following factors may be considered.

For example, an applicable scale of each reference picture in a reference picture list for a current picture may be determined, and a different scale may be applied according to a selected reference picture.

Alternatively, for example, scale-related information for a current picture/current slice may be signaled in a picture/slice unit, and based on the signaled scale-related information, a scale of the same ratio (for example, ×2) or a scale of the same ratio pair (for example, ×2 and ×½) may be selectively applied to all coding blocks in a picture/slice.

Alternatively, for example, a scale factor of scale-up/scale-down may be applied as an arbitrary value. For example, in order to prevent an increase in complexity, a scale factor may be limited and applied to a combination of specific values such as ×2 and ×½ or ×1.5 and ×1/1.5. Meanwhile, for example, when a size of a current block is W×H, a reference block for a scale factor of ×2 may be a block with a size W/2×H/2, and a reference block for a scale factor of ×½ may be a block with a size 2W×2H.

Alternatively, for example, a padding/sub-sampling method for scale-up/scale-down may be defined according to a scale factor.

Alternatively, for example, when an available scale pair is determined in a picture/slice unit, scale_idc in the unit of a CU may indicate ×1, ×2, and ×½, or ×1, ×1.5, and ×1/1.5, and a scale factor of a CU may be determined and used based on the scale_idc. That is, for example, based on a scale index for a current block, one of copies ×1, ×2, and ×½ may be selected and used as a scale factor of the current block. In this case, ×2 and ×1/1.5 may not be used interchangeably as scale factors.

Alternatively, for example, when a scale is determined in a unit of a picture/slice, a flag in the unit of a CU may be signaled, and a copy or one fixed scale may be used based on the signaled flag. For example, a flag in the unit of a CU may be signaled, and a copy or ×2 may be determined based on the signaled flag. That is, for example, a flag for a scale may be signaled for a current block, and the flag may indicate whether scaling is not applied (that is, whether a reference block is copied) or may indicate whether scaling is performed according to a specific scale factor.

Alternatively, for example, when a width and height of a block are different, different scales may be applied in vertical and horizontal directions.

In addition, as an example, the following method may be proposed for a general merge mode. For example, there may be proposed a method of inheriting and applying the same scale as a neighboring block according to a scale index (scale_idc) of a current block and an adjacent block. In addition, history-based MVP such as HMVP may be used by storing information of a corresponding block without any change. In addition, in combined MVP such as pairwise, only when values of respective candidates used for combination are the same, deformation is possible such as scaling is applied, or scale information of a specific candidate (for example, a first candidate) is selectively applied, or scaling is not applied in a corresponding case. Furthermore, for example, scaling may not be applied to a zero candidate or a temporal candidate.

In addition, the present disclosure proposes a method of controlling, in a high-level syntax, whether affine prediction/scaling is applied for a current block for which an IBC mode is selected. In addition, examples described below may be applied singly or in combination.

For example, whether to apply affine prediction (or scaling) for an IBC block (block to which an IBC mode is applied) may be on/off controlled in an SPS. That is, for example, information indicating whether to apply the affine prediction (or scaling) for the IBC block may be signaled in the SPS.

Alternatively, for example, whether to apply the affine prediction (or scaling) for the IBC block (block to which the IBC mode is applied) may be on/off controlled in a PPS. That is, for example, information indicating whether to apply the affine prediction (or scaling) for the IBC block may be signaled in the PPS.

Alternatively, for example, whether to apply the affine prediction (or scaling) for the IBC block (block to which the IBC mode is applied) may be on/off controlled in a PH. That is, for example, information indicating whether to apply the affine prediction (or scaling) for the IBC block may be signaled in the PH.

Alternatively, for example, whether to apply the affine prediction (or scaling) for the IBC block (block to which the IBC mode is applied) may be on/off controlled in an SH. That is, for example, information indicating whether to apply the affine prediction (or scaling) for the IBC block may be signaled in the SH.

Alternatively, for example, whether to apply the affine prediction for the IBC block (block to which the IBC mode is applied) may be on/off controlled in the SPS with the same syntax element as whether to apply affine prediction for a block to which an IBC mode is not applied.

Alternatively, for example, whether to apply the affine prediction for the IBC block (block to which the IBC mode is applied) may be on/off controlled in the PPS with the same syntax element as whether to apply the affine prediction for the block to which the IBC mode is not applied.

Alternatively, for example, whether to apply the affine prediction for the IBC block (block to which the IBC mode is applied) may be on/off controlled in the PH with the same syntax element as whether to apply affine prediction for a block to which an IBC mode is not applied.

Alternatively, for example, whether to apply the affine prediction for the IBC block (block to which the IBC mode is applied) may be on/off controlled in the SH with the same syntax element as whether to apply the affine prediction for the block to which the IBC mode is not applied.

Figure 17:
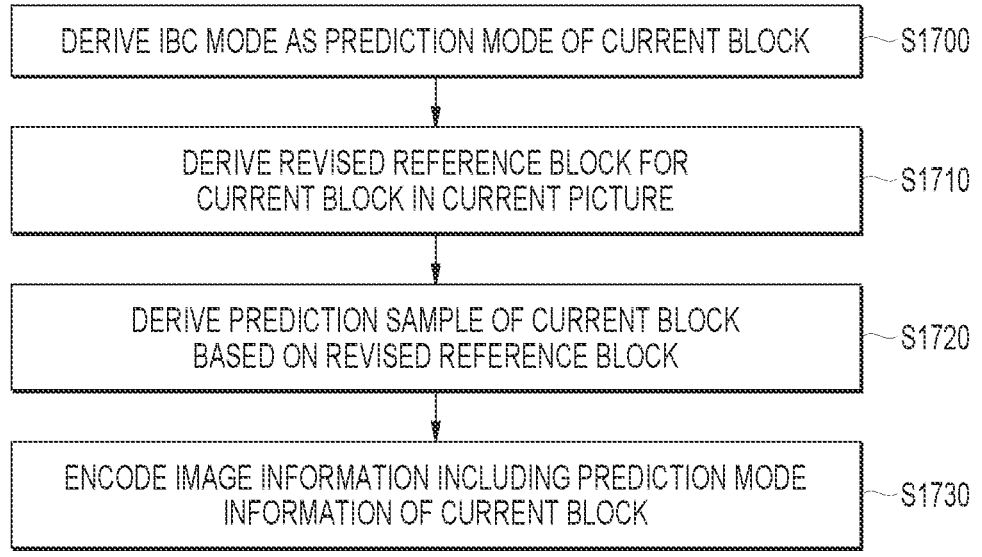
FIG. 17 schematically illustrates an image encoding method performed by an encoding apparatus according to the present disclosure.

FIG. 17 schematically illustrates an image encoding method performed by an encoding apparatus according to the present disclosure. The image encoding method shown in FIG. 17 may be performed by the encoding apparatus shown in FIG. 2. Specifically, for example, operations S1700 to S1720 of FIG. 17 may be performed by the predictor of the encoding apparatus, and operation S1730 may be performed by the entropy encoder of the encoding apparatus. In addition, although not shown, a process of deriving a residual sample for a current block may be performed by the residual processor of the encoding apparatus, and a process of generating a reconstructed sample and a reconstructed picture based on a prediction sample and the residual sample may be performed by the adder of the encoding apparatus.

The encoding apparatus derives an IBC mode as a prediction mode of the current block (S1700). The encoding apparatus may derive the IBC mode as the prediction mode of the current block. For example, the encoding apparatus may derive the IBC mode as the prediction mode of the current block and may encode prediction mode information of the current block. Image information may include the prediction mode information.

The encoding apparatus derives a revised reference block for the current block in a current picture (S1710).

The encoding apparatus may derive a reference block of the current block, and the reference block may be a block in the current picture.

For example, it may be determined whether affine prediction is applied to the current block, and when the affine prediction is applied to the current block, CPMVs of the current block may be derived, and the revised reference block for the current block may be derived based on the CPMVs.

For example, whether the affine prediction is applied to the current block may be defined based on information indicating whether to apply the affine prediction and/or a size of the current block. In addition, for example, an affine prediction type of the current block may be derived as a 6-parameter affine model or a 4-parameter affine model. For example, affine type information of the current block indicating the affine prediction type of the current block may be encoded. Additionally, information on the CPMV of the current block may be encoded. When the 6-parameter affine model is applied to the current block, CPMV0, CPMV1, and CPMV2 of the current block may be derived based on the information on the CPMV, or when the 4-parameter affine model is applied to the current block, CPMV0 and CPMV1 of the current block may be derived based on the information on the CPMV. For example, information on a CPMV including MVP index information of the current block may be encoded, an MVP list of the current block may be constructed, and the CPMVs of the current block may be derived based on MVP candidates in the MVP list indicated by the MVP index information. Alternatively, for example, the information on the CPMV including the MVP index information and MVD information of the current block may be encoded, an MVP list of the current block may be constructed, and the CPMVs of the current block may be derived based on the MVP candidates in the MVP list and the MVD information indicated by the information on the CPMV. The affine type information may refer to cu_affine_type_flag described above, the MVP index information may refer to mvp_l0_flag described above, and the MVD information may refer to mvd_coding described above.

Alternatively, for example, it may be determined whether affine prediction is applied to the current block, and when the affine prediction is applied to the current block, block vector information and an affine angle index of the current block may be encoded, a subblock motion vector of the current block may be derived based on the block vector information and a deformation angle indicated by the affine angle index, and the revised reference block for the current block may be derived based on the subblock motion vector. For example, the subblock motion vector may be derived based on Equation 3 described above. The affine angle index may indicate predetermined angles. For example, the affine angle index may indicate 45 degrees clockwise or 45 degrees counterclockwise. For example, when a value of the affine angle index is 0), the affine angle index may indicate 45 degrees clockwise, and when the value of the affine angle index is 1, the affine angle index may indicate 45 degrees counterclockwise. Alternatively, for example, when the value of the affine angle index is 0), the affine angle index may indicate that rotation is not applied, when the value of the affine angle index is 1, the affine angle index may indicate 45 degrees clockwise, and when the value of the affine angle index is 2, the affine angle index may indicate 45 degrees counterclockwise. Alternatively, for example, the affine angle index may indicate 45 degrees clockwise. 90 degrees clockwise. 45 degrees counterclockwise, or 90 degrees counterclockwise. For example, when the value of the affine angle index is 0), the affine angle index may indicate 45 degrees clockwise, when the value of the affine angle index is 1, the affine angle index may indicate 90 degrees clockwise, when the value of the affine angle index is 2, the affine angle index may indicate 45 degrees counterclockwise, and when the value of the affine angle index is 3, the affine angle index may indicate 90 degrees counterclockwise. Alternatively, for example, when the value of the affine angle index is 0, the affine angle index may indicate that rotation is not applied, when the value of the affine angle index is 1, the affine angle index may indicate 45 degrees clockwise, when the value of the affine angle index is 2, the affine angle index may indicate 90 degrees clockwise, when the value of the affine angle index is 3, the affine angle index may indicate 45 degrees counterclockwise, and when the value of the affine angle index is 4, the affine angle index may indicate 90 degrees counterclockwise. The affine angle index may refer to affine_angle_idc described above.

Alternatively, for example, it may be determined whether affine prediction is applied to the current block, and when the affine prediction is applied to the current block, block vector information and an affine angle index of the current block may be encoded, a block vector of the current block may be derived based on the block vector information, a reference block for the current block in a current picture may be derived based on the block vector, and the revised reference block for the current block may be derived based on the reference block and a deformation angle indicated by the affine angle index. That is, for example, the revised reference block may be derived by rotating the reference block at the deformation angle. The affine angle index may indicate predetermined angles. For example, the affine angle index may indicate 45 degrees clockwise or 45 degrees counterclockwise. For example, when a value of the affine angle index is 0, the affine angle index may indicate 45 degrees clockwise, and when the value of the affine angle index is 1, the affine angle index may indicate 45 degrees counterclockwise. Alternatively, for example, when the value of the affine angle index is 0), the affine angle index may indicate that rotation is not applied, when the value of the affine angle index is 1, the affine angle index may indicate 45 degrees clockwise, and when the value of the affine angle index is 2, the affine angle index may indicate 45 degrees counterclockwise. Alternatively, for example, the affine angle index may indicate 45 degrees clockwise, 90 degrees clockwise, 45 degrees counterclockwise, or 90 degrees counterclockwise. For example, when the value of the affine angle index is 0, the affine angle index may indicate 45 degrees clockwise, when the value of the affine angle index is 1, the affine angle index may indicate 90 degrees clockwise, when the value of the affine angle index is 2, the affine angle index may indicate 45 degrees counterclockwise, and when the value of the affine angle index is 3, the affine angle index may indicate 90 degrees counterclockwise. Alternatively, for example, when the value of the affine angle index is 0), the affine angle index may indicate that rotation is not applied, when the value of the affine angle index is 1, the affine angle index may indicate 45 degrees clockwise, when the value of the affine angle index is 2, the affine angle index may indicate 90 degrees clockwise, when the value of the affine angle index is 3, the affine angle index may indicate 45 degrees counterclockwise, and when the value of the affine angle index is 4, the affine angle index may indicate 90 degrees counterclockwise. The affine angle index may refer to affine_angle_idc described above.

In addition, for example, a search range in the current picture for deriving the revised reference block may be derived based on whether to apply affine prediction. Alternatively, for example, the search range in the current picture for deriving the revised reference block of the current block may be derived based on whether to apply affine prediction. Alternatively, for example, the search range in the current picture for deriving the revised reference block may be derived based on an affine prediction type of the current block. Alternatively, for example, information on the search range in the current picture for deriving the revised reference block may be signaled with an SPS, a PPS, a PH, or an SH, and the search range may be derived based on the information on the search range. Alternatively, for example, the search range may be applied as a preset range.

Alternatively, for example, it may be determined whether scaling is applied to the current block, and when the scaling is applied to the current block, block vector information and a scale index of the current block may be encoded, a block vector of the current block may be derived based on the block vector information, a reference block for the current block in a current picture may be derived based on the block vector, and the revised reference block for the current block may be derived by scaling the reference block based on the scale index. For example, whether the scaling is applied to the current block may be determined based on information indicating whether to apply the scaling and/or a size of the current block. In addition, for example, the scale index may indicate scale-up or scale-down. For example, when a value of the scale index is 0, the scale index may indicate copy, when the value of the scale index is 1, the scale index may indicate scale-up, and when the value of the scale index is 2, the scale index may indicate scale-down. When the scale index indicates the scale-up, the revised reference block for the current block may be derived by scaling the reference block according to a scale factor for scale-up. For example, the scale factor for the scale-up may be a preset value. For example, the scale factor for the scale-up may be ×2 or ×1.5. Alternatively, for example, the scale factor for the scale-up may be derived based on scale information on a current picture or scale information on a current slice. When the scale index indicates the scale-down, the revised reference block for the current block may be derived by scaling the reference block according to a scale factor for scale-down. For example, the scale factor for the scale-down may be a preset value. For example, the scale factor for the scale-down may be ×½ or ×1/1.5. Alternatively, for example, the scale factor for the scale-down may be derived based on scale information on a current picture or scale information on a current slice. The scale index may refer to ibc_scale_idc described above. Alternatively, for example, when a width and height of the current block are different, scaling for the width of the current block and scaling for the height of the current block may be applied according to different scale factors.

In addition, for example, an interpolation filter may be used for scaling up the reference block. That is, for example, when the scale index indicates the scale-up, the revised reference block may be derived using an interpolation filter for samples of the reference block. Alternatively, for example, padding may be used for scaling up the reference block. That is, for example, when the scale index indicates the scale-up, the revised reference block may be derived by padding samples of the reference block.

In addition, for example, a decimation filter may be used for scaling down the reference block. That is, for example, when the scale index indicates the scale-down, the revised reference block may be derived using a decimation filter for samples of the reference block. Alternatively, for example, sub-sampling may be used for scaling down the reference block. That is, for example, when the scale index indicates the scale-down, the revised reference block may be derived by sub-sampling samples of the reference block.

In addition, for example, a search range in the current picture for deriving the revised reference block may be derived based on whether to apply scaling. Alternatively, for example, the search range in the current picture for deriving the revised reference block of the current block may be derived based on a scale factor of the current block. Alternatively, for example, information on the search range in the current picture for deriving the revised reference block may be signaled with an SPS, a PPS, a PH, or an SH, and the search range may be derived based on the information on the search range. Alternatively, for example, the search range may be applied as a preset range.

In addition, for example, information indicating whether to apply affine prediction to a block to which the IBC mode is applied may be signaled with an SPS, a PPS, a PH, or an SH. Image information may include the information indicating whether to apply the affine prediction. Furthermore, for example, information indicating whether to apply scaling to the block to which the IBC mode is applied may be signaled with an SPS, a PPS, a PH, or an SH. Image information may include the information indicating whether to apply the scaling. In addition, information indicating whether to apply the affine prediction to both the block to which the IBC mode is applied and a block to which the IBC mode is not applied may be signaled with an SPS, a PPS, a PH, or an SH. Image information may include the information indicating whether to apply the affine prediction. In addition, information indicating whether to apply the scaling to both the block to which the IBC mode is applied and the block to which the IBC mode is not applied may be signaled with an SPS, a PPS, a PH, or an SH. Image information may include the information indicating whether to apply the scaling.

The encoding apparatus derives prediction samples of the current block based on the revised reference block (S1720). The encoding apparatus may derive the prediction samples or a prediction block of the current block based on the revised reference block. The encoding apparatus may copy the revised reference block and may derive the prediction samples of the current block.

The encoding apparatus encodes image information including prediction mode information of the current block (S1730). The encoding apparatus may encode the image information including the prediction mode information of the current block. For example, the encoding apparatus may generate and encode the prediction mode information for the current block. For example, the prediction mode information may indicate the IBC mode applied to the current block.

In addition, for example, the encoding apparatus may generate and encode the affine type information of the current block, the information on the CPMV, the block vector information, the affine angle index, the information on the search range, the scale index, the information indicating whether to apply the affine prediction, the information indicating whether to apply the scaling, and/or residual information. The image information may include the prediction mode information of the current block, the affine type information, the information on the CPMV, the block vector information, the affine angle index, the information on the search range, the scale index, the information indicating whether to apply the affine prediction, the information indicating whether to apply the scaling, and/or the residual information. In addition, for example, the encoding apparatus may encode the image information and may output it in the form of a bitstream.

Meanwhile, the bitstream including the image information may be transmitted to a decoding apparatus via a network or (digital) storage medium. Here, the network may include a broadcasting network and/or a communication network, and the digital storage medium may include various storage media such as a USB, an SD, a CD, a DVD, a Blue-ray disc, an HDD, and an SSD.

Figure 18:
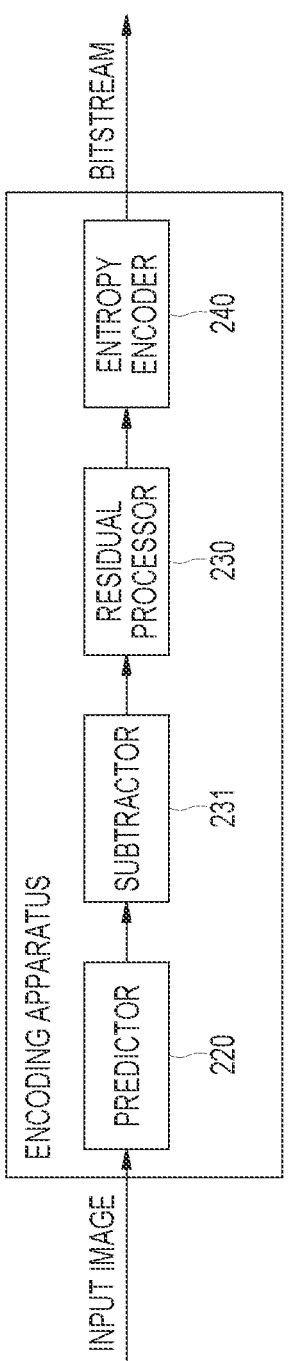
FIG. 18 schematically illustrates an encoding apparatus that performs an image encoding method according to the present disclosure.

FIG. 18 schematically illustrates an encoding apparatus that performs an image encoding method according to the present disclosure. The method shown in FIG. 17 may be performed by the encoding apparatus shown in FIG. 18. Specifically, for example, a predictor of the encoding apparatus of FIG. 18 may perform operations S1700 to S1720, and an entropy encoder of the encoding apparatus may perform operation S1730. Although not shown, a process of deriving a residual sample for a current block may be performed by a residual processor of the encoding apparatus, and a process of generating a reconstructed sample and a reconstructed picture based on a prediction sample and the residual sample may be performed by an adder of the encoding apparatus.

Figure 19:
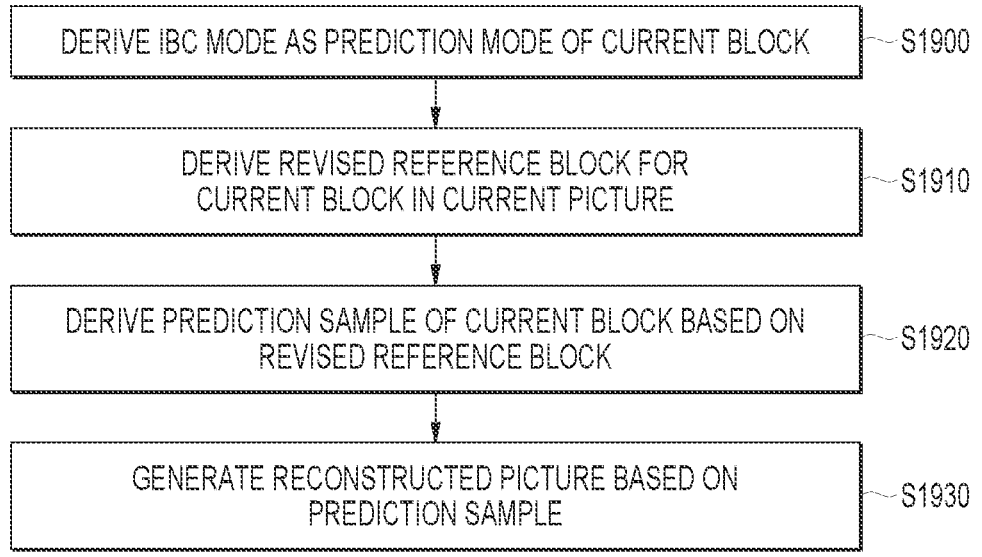
FIG. 19 schematically illustrates an image decoding method performed by a decoding apparatus according to the present disclosure.

FIG. 19 schematically illustrates an image decoding method performed by a decoding apparatus according to the present disclosure. The method shown in FIG. 19 may be performed by the decoding apparatus shown in FIG. 3. Specifically, for example, operations S1900 to S1920 of FIG. 19 may be performed by the predictor of the decoding apparatus, and operations S1930 of FIG. 19 may be performed by the adder of the decoding apparatus. In addition, although not shown, a process of obtaining image information including residual information of a current block through a bitstream may be performed by the entropy decoder of the decoding apparatus, and a process of deriving a residual sample for the current block based on the residual information may be performed by the inverse transformer of the decoding apparatus.

The decoding apparatus derives an IBC mode as a prediction mode of the current block (S1900). The decoding apparatus may derive the IBC mode as the prediction mode of the current block. For example, the decoding apparatus may obtain prediction mode information of the current block through a bitstream and may derive the prediction mode of the current block as the IBC mode based on the prediction mode information. Image information may include the prediction mode information.

The decoding apparatus derives a revised reference block for the current block in a current picture (S1910).

The decoding apparatus may derive a reference block of the current block, and the reference block may be a block in the current picture.

For example, it may be determined whether affine prediction is applied to the current block, and when the affine prediction is applied to the current block, CPMVs of the current block may be derived, and the revised reference block for the current block may be derived based on the CPMVs. For example, whether the affine prediction is applied to the current block may be determined based on information indicating whether to apply the affine prediction and/or a size of the current block. In addition, for example, an affine prediction type of the current block may be derived as a 6-parameter affine model or a 4-parameter affine model. For example, affine type information of the current block may be obtained through a bitstream, and the affine prediction type of the current block may be derived based on the affine type information. In addition, information on the CPMV of the current block may be obtained through a bitstream, the CPMVs of the current block may be derived based on the information on the CPMV, and the revised reference block for the current block may be derived based on the CPMVs. When the 6-parameter affine model is applied to the current block, CPMV0, CPMV1, and CPMV2 of the current block may be derived based on the information on the CPMV, or when the 4-parameter affine model is applied to the current block, CPMV0 and CPMV1 of the current block may be derived based on the information on the CPMV. For example, the information on the CPMV including MVP index information of the current block may be obtained through a bitstream, an MVP list of the current block may be constructed, and the CPMVs of the current block may be derived based on MVP candidates in the MVP list indicated by the MVP index information. Alternatively, for example, the information on the CPMV including the MVP index information and MVD information of the current block may be obtained through a bitstream, the MVP list of the current block may be constructed, and the CPMVs of the current block may be derived based on the MVP candidates in the MVP list and the MVD information indicated by the information on the CPMV. The affine type information may refer to cu_affine_type_flag described above, the MVP index information may refer to mvp_l0_flag described above, and the MVD information may refer to mvd_coding described above.

Alternatively, for example, it may be determined whether affine prediction is applied to the current block, and when the affine prediction is applied to the current block, block vector information and an affine angle index of the current block may be obtained through a bitstream, a subblock motion vector of the current block may be derived based on the block vector information and a deformation angle indicated by the affine angle index, and the revised reference block for the current block may be derived based on the subblock motion vector. For example, the subblock motion vector may be derived based on Equation 3 described above. The affine angle index may indicate predetermined angles. For example, the affine angle index may indicate 45 degrees clockwise or 45 degrees counterclockwise. For example, when a value of the affine angle index is 0, the affine angle index may indicate 45 degrees clockwise, and when the value of the affine angle index is 1, the affine angle index may indicate 45 degrees counterclockwise. Alternatively, for example, when the value of the affine angle index is 0), the affine angle index may indicate that rotation is not applied, when the value of the affine angle index is 1, the affine angle index may indicate 45 degrees clockwise, and when the value of the affine angle index is 2, the affine angle index may indicate 45 degrees counterclockwise. Alternatively, for example, the affine angle index may indicate 45 degrees clockwise, 90 degrees clockwise, 45 degrees counterclockwise, or 90 degrees counterclockwise. For example, when the value of the affine angle index is 0, the affine angle index may indicate 45 degrees clockwise, when the value of the affine angle index is 1, the affine angle index may indicate 90 degrees clockwise, when the value of the affine angle index is 2, the affine angle index may indicate 45 degrees counterclockwise, and when the value of the affine angle index is 3, the affine angle index may indicate 90 degrees counterclockwise. Alternatively, for example, when the value of the affine angle index is 0, the affine angle index may indicate that rotation is not applied, when the value of the affine angle index is 1, the affine angle index may indicate 45 degrees clockwise, when the value of the affine angle index is 2, the affine angle index may indicate 90 degrees clockwise, when the value of the affine angle index is 3, the affine angle index may indicate 45 degrees counterclockwise, and when the value of the affine angle index is 4, the affine angle index may indicate 90 degrees counterclockwise. The affine angle index may refer to affine_angle_idc described above.

Alternatively, for example, it may be determined whether affine prediction is applied to the current block, and when the affine prediction is applied to the current block, block vector information and an affine angle index of the current block may be obtained through a bitstream, a block vector of the current block may be derived based on the block vector information, a reference block for the current block in a current picture may be derived based on the block vector, and the revised reference block for the current block may be derived based on the reference block and a deformation angle indicated by the affine angle index. That is, for example, the revised reference block may be derived by rotating the reference block at the deformation angle. The affine angle index may indicate predetermined angles. For example, the affine angle index may indicate 45 degrees clockwise or 45 degrees counterclockwise. For example, when a value of the affine angle index is 0, the affine angle index may indicate 45 degrees clockwise, and when the value of the affine angle index is 1, the affine angle index may indicate 45 degrees counterclockwise. Alternatively, for example, when the value of the affine angle index is 0), the affine angle index may indicate that rotation is not applied, when the value of the affine angle index is 1, the affine angle index may indicate 45 degrees clockwise, and when the value of the affine angle index is 2, the affine angle index may indicate 45 degrees counterclockwise. Alternatively, for example, the affine angle index may indicate 45 degrees clockwise, 90 degrees clockwise, 45 degrees counterclockwise, or 90 degrees counterclockwise. For example, when the value of the affine angle index is 0, the affine angle index may indicate 45 degrees clockwise, when the value of the affine angle index is 1, the affine angle index may indicate 90 degrees clockwise, when the value of the affine angle index is 2, the affine angle index may indicate 45 degrees counterclockwise, and when the value of the affine angle index is 3, the affine angle index may indicate 90 degrees counterclockwise. Alternatively, for example, when the value of the affine angle index is 0, the affine angle index may indicate that rotation is not applied, when the value of the affine angle index is 1, the affine angle index may indicate 45 degrees clockwise, when the value of the affine angle index is 2, the affine angle index may indicate 90 degrees clockwise, when the value of the affine angle index is 3, the affine angle index may indicate 45 degrees counterclockwise, and when the value of the affine angle index is 4, the affine angle index may indicate 90 degrees counterclockwise. The affine angle index may refer to affine_angle_idc described above.

In addition, for example, a search range in the current picture for deriving the revised reference block may be derived based on whether to apply affine prediction. Alternatively, for example, the search range in the current picture for deriving the revised reference block of the current block may be derived based on whether to apply the affine prediction. Alternatively, for example, the search range in the current picture for deriving the revised reference block may be derived based on an affine prediction type of the current block. Alternatively, for example, information on the search range in the current picture for deriving the revised reference block may be signaled with an SPS, a PPS, a PH, or an SH, and the search range may be derived based on the information on the search range. Alternatively, for example, the search range may be applied as a preset range.

Alternatively, for example, it may be determined whether scaling is applied to the current block, and when the scaling is applied to the current block, block vector information and a scale index of the current block may be obtained through a bitstream, a block vector of the current block may be derived based on the block vector information, a reference block for the current block in a current picture may be derived based on the block vector, and the revised reference block for the current block may be derived by scaling the reference block based on the scale index. For example, whether the scaling is applied to the current block may be determined based on information indicating whether to apply the scaling and/or a size of the current block. In addition, for example, the scale index may indicate scale-up or scale-down. For example, when a value of the scale index is 0, the scale index may indicate copy, when the value of the scale index is 1, the scale index may indicate scale-up, and when the value of the scale index is 2, the scale index may indicate scale-down. When the scale index indicates the scale-up, the revised reference block for the current block may be derived by scaling the reference block according to a scale factor for scale-up. For example, the scale factor for the scale-up may be a predetermined value. For example, the scale factor for the scale-up may be ×2 or ×1.5. Alternatively, for example, the scale factor for the scale-up may be derived based on scale information on a current picture or scale information on a current slice. When the scale index indicates the scale-down, the revised reference block for the current block may be derived by scaling the reference block according to a scale factor for scale-down. For example, the scale factor for the scale-down may be a predetermined value. For example, the scale factor for the scale-down may be ×½ or ×1/1.5. Alternatively, for example, the scale factor for the scale-down may be derived based on scale information on a current picture or scale information on a current slice. The scale index may refer to ibc_scale_idc described above. Alternatively, for example, when a width and height of the current block are different, scaling for the width of the current block and scaling for the height of the current block may be applied according to different scale factors.

In addition, for example, an interpolation filter may be used for scaling up the reference block. That is, for example, when the scale index indicates the scale-up, the revised reference block may be derived using an interpolation filter for samples of the reference block. Alternatively, for example, padding may be used for scaling up the reference block. That is, for example, when the scale index indicates the scale-up, the revised reference block may be derived by padding samples of the reference block.

In addition, for example, a decimation filter may be used for scaling down the reference block. That is, for example, when the scale index indicates the scale-down, the revised reference block may be derived using a decimation filter for samples of the reference block. Alternatively, for example, sub-sampling may be used for scaling down the reference block. That is, for example, when the scale index indicates the scale-down, the revised reference block may be derived by sub-sampling samples of the reference block.

In addition, for example, a search range in the current picture for deriving the revised reference block may be derived based on whether to apply scaling. Alternatively, for example, the search range in the current picture for deriving the revised reference block of the current block may be derived based on a scale factor of the current block. Alternatively, for example, information on the search range in the current picture for deriving the revised reference block may be signaled with an SPS, a PPS, a PH, or an SH, and the search range may be derived based on the information on the search range. Alternatively, for example, the search range may be applied as a predetermined range.

In addition, for example, information indicating whether to apply affine prediction to a block to which the IBC mode is applied may be signaled with an SPS, a PPS, a PH, or an SH. Image information may include the information indicating whether to apply the affine prediction. Furthermore, for example, information indicating whether to apply scaling to the block to which the IBC mode is applied may be signaled with an SPS, a PPS, a PH, or an SH. Image information may include the information indicating whether to apply the scaling. In addition, information indicating whether to apply the affine prediction to both the block to which the IBC mode is applied and a block to which the IBC mode is not applied may be signaled with an SPS, a PPS, a PH, or an SH. Image information may include the information indicating whether to apply the affine prediction. In addition, information indicating whether to apply the scaling to both the block to which the IBC mode is applied and the block to which the IBC mode is not applied may be signaled with an SPS, a PPS, a PH, or an SH. Image information may include the information indicating whether to apply the scaling.

The decoding apparatus derives prediction samples of the current block based on the revised reference block (S1920). The decoding apparatus may derive the prediction samples or a prediction block of the current block based on the revised reference block. The decoding apparatus may copy the revised reference block and may derive the prediction samples of the current block.

The decoding apparatus generates a reconstructed picture based on the prediction sample (S1930). For example, the decoding apparatus may generate the reconstructed picture based on the prediction sample.

Meanwhile, for example, the decoding apparatus may derive a residual sample of the current block based on the residual information of the current block obtained through the bitstream and may generate the reconstructed picture by adding the prediction sample and the residual sample. After, in order to improve subjective/objective image quality, if necessary, in-loop filtering procedures such as deblocking filtering. SAO, and/or ALF procedures may be applied to the reconstructed samples as described above.

Meanwhile, for example, the decoding apparatus may obtain image information of the current block through a bitstream. The image information may include the prediction mode information of the current block, the affine type information, the information on the CPMV, the block vector information, the affine angle index, the information on the search range, the scale index, the information indicating whether to apply the affine prediction, the information indicating whether to apply the scaling, and/or the residual information.

Figure 20:
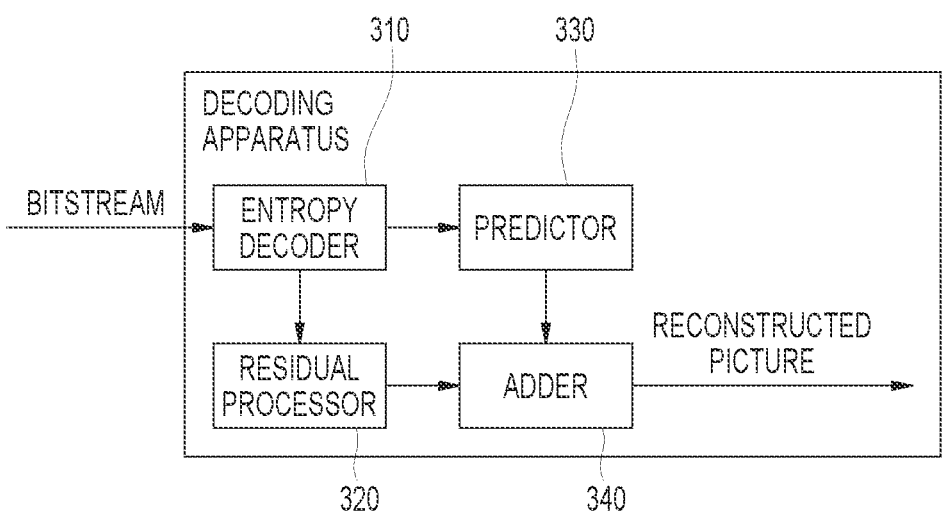
FIG. 20 schematically illustrates a decoding apparatus that performs an image decoding method according to the present disclosure.

FIG. 20 schematically illustrates a decoding apparatus that performs an image decoding method according to the present disclosure. The method shown in FIG. 19 may be performed by the decoding apparatus shown in FIG. 20. Specifically, for example, a predictor of the decoding apparatus of FIG. 20 may perform operations S1900 to S1920 of FIG. 19, and an adder of the decoding apparatus of FIG. 20 may perform operation S1930 of FIG. 19.

According to the present disclosure described above, by applying affine prediction in relation to a current block to which an IBC mode is applied, in consideration of deformation, a more accurate reference block is derived, thereby improving prediction accuracy and improving overall coding efficiency.

According to the present disclosure, by applying affine prediction in consideration of only rotation deformation in relation to a current block to which an IBC mode is applied, a more accurate reference block is derived, thereby improving prediction accuracy and improving overall coding efficiency.

According to the present disclosure, by applying scaling in relation to a current block to which an IBC mode is applied, in consideration of deformation, a reference block is derived, thereby improving prediction accuracy and improving overall coding efficiency.

In the above-described embodiment, the methods are described based on the flowchart having a series of steps or blocks. The disclosure is not limited to the order of the above steps or blocks. Some steps or blocks may occur simultaneously or in a different order from other steps or blocks as described above. Further, those skilled in the art will understand that the steps shown in the above flowchart are not exclusive, that further steps may be included, or that one or more steps in the flowchart may be deleted without affecting the scope of the present disclosure.

The embodiments described in the present disclosure may be implemented on and performed by a processor, a microprocessor, a controller, or a chip. For example, functional units shown in each drawing may be implemented on and performed by a computer, a processor, a microprocessor, a controller, or a chip. In this case, information for implementation (for example, information on instructions) or an algorithm may be stored in a digital storage medium.

In addition, the decoding apparatus and the encoding apparatus to which the embodiments of the present disclosure are applied may be included in a multimedia broadcasting transmission/reception apparatus, a mobile communication terminal, a home cinema video apparatus, a digital cinema video apparatus, a surveillance camera, a video chatting apparatus, a real-time communication apparatus such as video communication, a mobile streaming apparatus, a storage medium, a camcorder, a video-on-demand (VOD) service providing apparatus, an Over the top (OTT) video apparatus, an Internet streaming service providing apparatus, a three-dimensional (3D) video apparatus, a teleconference video apparatus, a transportation user equipment (for example, vehicle user equipment, an airplane user equipment, or a ship user equipment), and a medical video apparatus and may be used to process video signals and data signals. For example, the OTT video apparatus may include a game console, a Blue-ray player, an internet access TV, a home theater system, a smart phone, a tablet personnel computer (PC), a digital video recorder (DVR), and the like.

Furthermore, the processing method to which the embodiments of the present disclosure are applied may be produced in the form of a program that is to be executed by a computer and may be stored in a computer-readable recording medium. Multimedia data having a data structure according to the present disclosure may also be stored in computer-readable recording media. The computer-readable recording media include all types of storage devices and distributed storage devices in which data readable by a computer system is stored. The computer-readable recording media may include, for example, a Blue-ray disc (BD), a USB, a read-only memory (ROM), a programmable ROM (PROM), an erasable programmable ROM (EPROM), an electrically erasable and programmable ROM (EEPROM), a random access memory (RAM), a CD-ROM, a magnetic tape, a floppy disc, and an optical data storage device. Furthermore, the computer-readable recording media includes media implemented in the form of carrier waves (e.g., transmission through the Internet). In addition, a bitstream generated by the encoding method may be stored in a computer-readable recording medium or may be transmitted through wired/wireless communication networks.

In addition, the embodiments of the present disclosure may be implemented with a computer program product according to program codes, and the program codes may be performed in a computer according to embodiments of the present disclosure. The program codes may be stored on a carrier which is readable by a computer.

Figure 21:
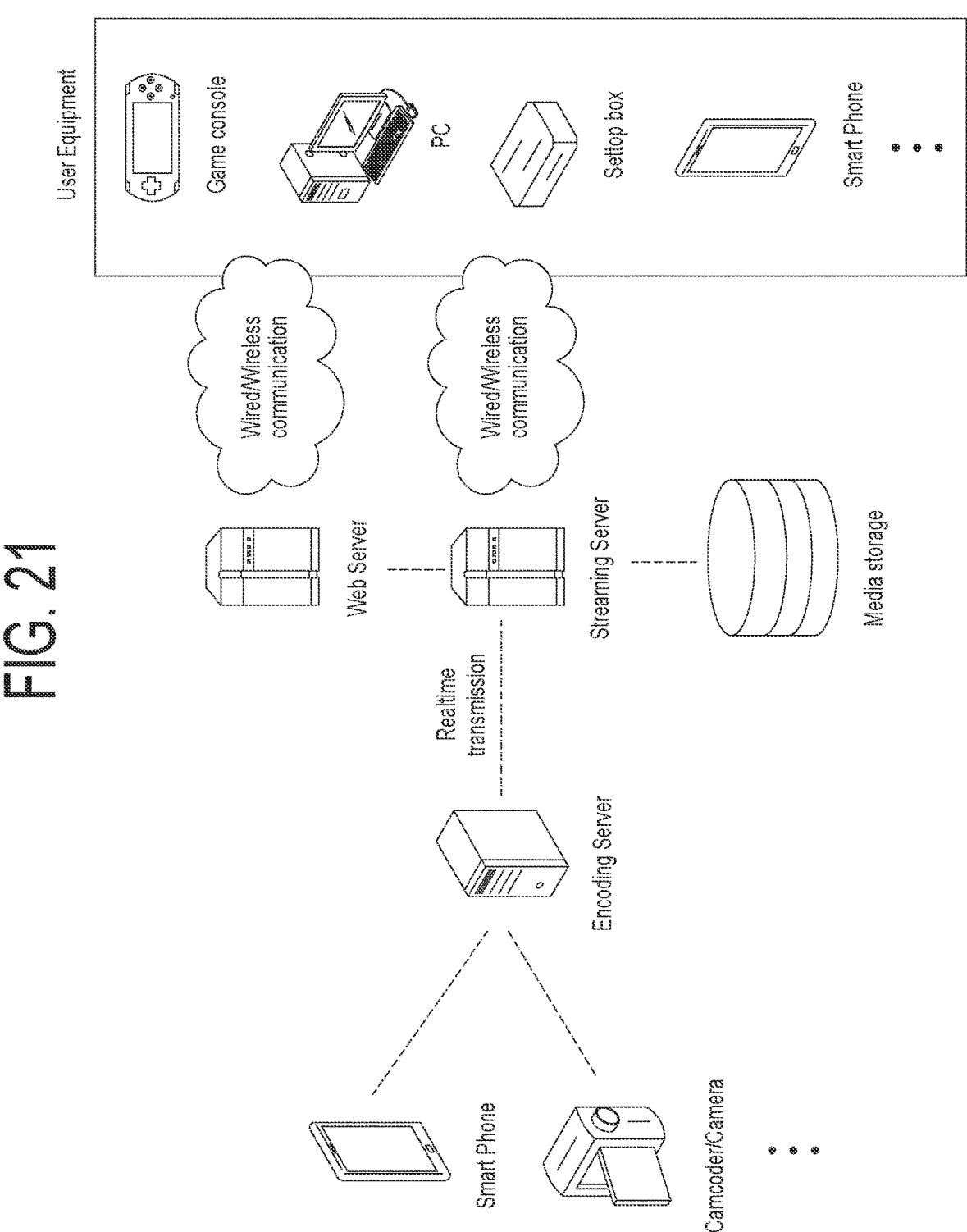
FIG. 21 is an exemplary structural diagram of a content streaming system to which embodiments of the present disclosure are applied.

FIG. 21 is an exemplary structural diagram of a content streaming system to which embodiments of the present disclosure are applied.

The content streaming system to which the embodiments of the present disclosure are applied may mainly include an encoding server, a streaming server, a web server, a media storage, a user device, and a multimedia input device.

The encoding server compresses content input from multimedia input devices such as a smartphone, a camera, and a camcorder into digital data to generate a bitstream and transmit the bitstream to the streaming server. As another example, when the multimedia input devices such as the smartphone, the camera, and the camcorder directly generate a bitstream, the encoding server may be omitted.

The bitstream may be generated by an encoding method or a bitstream generating method to which the embodiments of the present disclosures are applied, and the streaming server may temporarily store the bitstream in a process of transmitting or receiving the bitstream.

The streaming server transmits multimedia data to a user device based on a user's request through the web server, and the web server serves as a medium for informing the user of a service. When a user requests a desired service from the web server, the web server delivers it to a streaming server, and the streaming server transmits multimedia data to the user. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a certain time.

Examples of the user device may include a mobile phone, a smartphone, a laptop computer, a digital broadcasting terminal, a personal digital assistant (PDA), a portable multimedia player (PMP), a navigation device, a slate PC, a tablet PC, an ultrabook, a wearable device (for example, a smartwatch, smart glasses, or a head mounted display), a digital television (TV), a desktops computer, a digital signage, and the like. Each server in the content streaming system may be operated as a distributed server, in which case data received from each server may be distributed.

The claims described herein may be combined in various ways. For example, the technical features of the method claims of the present disclosure may be combined to be implemented as an apparatus, and the technical features of the apparatus claims of the present disclosure may be combined to be implemented as a method. In addition, the technical features of the method claim of the present disclosure and the technical features of the apparatus claim may be combined to be implemented as an apparatus, and the technical features of the method claim of the present disclosure and the technical features of the apparatus claim may be combined to be implemented as a method.

What is claimed is:

1. An image decoding method that is performed by a decoding apparatus, the image decoding method comprising:

derive an intra block copy (IBC) mode as a prediction mode of a current block;

deriving a revised reference block for the current block in a current picture;

deriving a prediction sample of the current block based on the revised reference block; and generating a reconstructed picture based on the prediction sample, wherein whether affine prediction is applied to the current block is determined, wherein, based on the affine prediction being applied to the current block, block vector information and an affine angle index of the current block are obtained through a bitstream, and wherein the revised reference block for the current block is derived based on the block vector information and the affine angle index of the current block.

2. The image decoding method of claim 1, wherein, based on the affine prediction being applied to the current block, control point motion vectors (CPMVs) of the current block are derived, and wherein the revised reference block for the current block is derived based on the CPMVs.

3. The image decoding method of claim 2, wherein information on the CPMV including motion vector prediction (MVP) index information of the current block is obtained through a bitstream, an MVP list of the current block is constructed, and the CPMVs of the current block are derived based on MVP candidates in the MVP list indicated by the MVP index information.

4. The image decoding method of claim 1, wherein a subblock motion vector of the current block is derived based on the block vector information and a deformation angle indicated by the affine angle index, and wherein the revised reference block for the current block is derived based on the subblock motion vector.

5. The image decoding method of claim 4, wherein the subblock motion vector is derived based on an Equation below, $$\begin{bmatrix} \cos\theta & -\sin\theta \\ \sin\theta & \cos\theta \end{bmatrix}\begin{bmatrix} x \\ y \end{bmatrix},$$

where $\theta$ denotes the deformation angle, x denotes an x coordinate of a center position of a reference block indicated by the block vector information, and y denotes y coordinate of the center position of the reference block indicated by the block vector information.

6. The image decoding method of claim 1,
wherein a block vector of the current block is derived based on the block vector information, and
wherein the revised reference block for the current block is derived based on a reference block, which is derived based on the block vector, for the current block in the current picture, and a deformation angle indicated by the affine angle index.

7. The image decoding method of claim 1,
wherein, based on scaling being applied to the current block, block vector information and a scale index of the current block are obtained through a bitstream,
wherein a block vector of the current block is derived based on the block vector information,
wherein a reference block for the current block in the current picture is derived based on the block vector, and
wherein the revised reference block for the current block is derived by scaling the reference block based on the scale index.

8. The image decoding method of claim 7, wherein, based on the scale index indicating scale-up, the revised reference block is derived using an interpolation filter for samples of the reference block.

9. The image decoding method of claim 7, wherein, based on the scale index indicating scale-up, the revised reference block is derived by padding a sample of the reference block.

10. The image decoding method of claim 7, wherein, based on the scale index indicating scale-down, the revised reference block is derived using a decimation filter for samples of the reference block.

11. The image decoding method of claim 7, wherein, based on the scale index indicating scale-down, the revised reference block is derived by sub-sampling a sample of the reference block.

12. An image encoding method that is performed by an encoding apparatus, the image encoding method comprising:

deriving an intra block copy (IBC) mode as a prediction mode of a current block;
deriving a revised reference block for the current block in a current picture;
deriving a prediction sample of the current block based on the revised reference block; and
encoding image information including prediction mode information of the current block,
wherein whether affine prediction is applied to the current block is determined,
wherein, based on the affine prediction being applied to the current block, block vector information and an affine angle index of the current block are derived, and
wherein the revised reference block for the current block is derived based on the block vector information and the affine angle index of the current block.

13. The image encoding method of claim 12,
wherein, based on the affine prediction being applied to the current block, control point motion vectors (CPMVs) of the current block are derived,
wherein the revised reference block for the current block is derived based on the CPMVs, and
information on the CPMV including MVP index information of the current block is encoded.

14. A digital storage medium in which a bitstream including the prediction mode information encoded by the image encoding method of claim 12 is stored.

15. A transmission method of data for an image, the transmission method comprising:
obtaining a bitstream of image information including prediction mode information of a current block; and
transmitting the data including the bitstream of the image information which includes the prediction mode information,
wherein the prediction mode information is encoded by deriving an intra block copy (IBC) mode as a prediction mode of the current block, deriving a revised reference block for the current block in a current picture, and deriving a prediction sample of the current block based on the revised reference block,
wherein whether affine prediction is applied to the current block is determined,
wherein, based on the affine prediction being applied to the current block, block vector information and an affine angle index of the current block are derived, and
wherein the revised reference block for the current block is derived based on the block vector information and the affine angle index of the current block.

* * * * *